United States Patent
Dean et al.

(10) Patent No.: US 8,474,854 B2
(45) Date of Patent: Jul. 2, 2013

(54) FOLDABLE STROLLER AND FOLD INTERLOCK MECHANISM

(75) Inventors: Roy L. Dean, Pottstown, PA (US);
Stephen Ahnert, Philadelphia, PA (US);
Robert Pike, Reading, PA (US);
Damaso A. Lamos, Reading, PA (US);
Daniel Newhard, Lititz, PA (US); Todd Grintz, Glenmoore, PA (US); Branden McCorkel, Mount Joy, PA (US)

(73) Assignee: Graco Children's Products Inc., Atlanta, GA (US)

( * ) Notice: Subject to any disclaimer, the term of this patent is extended or adjusted under 35 U.S.C. 154(b) by 297 days.

(21) Appl. No.: 12/410,243

(22) Filed: Mar. 24, 2009

(65) Prior Publication Data

US 2010/0244408 A1 Sep. 30, 2010

(51) Int. Cl.
*B62B 7/00* (2006.01)
(52) U.S. Cl.
USPC ........................................ 280/647; 280/47.38
(58) Field of Classification Search
USPC .................. 280/647, 650, 30, 642, 643, 648,
280/649, 657, 658, 47.17, 47.18, 47.25, 47.38,
280/47.4; 403/103; 297/217.1
See application file for complete search history.

(56) References Cited

U.S. PATENT DOCUMENTS

| | | | | |
|---|---|---|---|---|
| 1,915,234 | A * | 6/1933 | Magusin | 280/30 |
| 2,880,011 | A | 3/1959 | Peterson | |
| 5,257,799 | A * | 11/1993 | Cone et al. | 280/642 |
| 5,605,409 | A * | 2/1997 | Haut et al. | 403/102 |
| 5,709,400 | A | 1/1998 | Bonnier et al. | |
| 5,865,447 | A * | 2/1999 | Huang | 280/30 |
| 6,189,914 | B1 | 2/2001 | Worth et al. | |
| 6,241,274 | B1 * | 6/2001 | Huang | 280/642 |
| 6,530,591 | B2 * | 3/2003 | Huang | 280/650 |
| 6,695,400 | B2 * | 2/2004 | Washizuka et al. | 297/130 |
| 7,032,922 | B1 * | 4/2006 | Lan | 280/648 |
| 7,077,420 | B1 | 7/2006 | Santoski | |

(Continued)

FOREIGN PATENT DOCUMENTS

| | | |
|---|---|---|
| DE | 299 00 901 | 11/1991 |
| EP | 0 567 422 | * 10/1993 |
| EP | 1 647 463 | 4/2006 |
| EP | 1 900 599 | 3/2008 |

OTHER PUBLICATIONS

International Search Report and Written Opinion issued in related PCT Application No. PCT/US2009/069666 mailed Jun. 4, 2010.

*Primary Examiner* — Katy M Ebner
*Assistant Examiner* — Emma K Frick
(74) *Attorney, Agent, or Firm* — Lempia Summerfield Katz LLC

(57) ABSTRACT

A foldable stroller has a frame assembly with a frame fold joint and is reconfigurable between an in-use configuration and a folded configuration. A child support structure is repositionable between a usable state on the frame assembly in the in-use configuration and an unusable state not suitable to support a child on the frame assembly. An interlock mechanism cooperates with the child support structure and is movable between a locked state preventing the frame assembly from being folded from the in-use configuration to the folded configuration and an unlocked state permitting the frame assembly to be folded. With the frame assembly in the in-use configuration and the child support structure on the frame assembly in the usable state, the interlock mechanism is retained in the locked state. The interlock mechanism is unlocked when the child support structure is moved to the unusable state.

13 Claims, 27 Drawing Sheets

U.S. PATENT DOCUMENTS

| | | | |
|---|---|---|---|
| 7,118,121 B2* | 10/2006 | Cheng et al. | 280/642 |
| 7,267,359 B1* | 9/2007 | Yang et al. | 280/642 |
| 7,401,803 B1* | 7/2008 | Lai | 280/647 |
| 7,681,894 B2* | 3/2010 | Santamaria | 280/47.38 |
| 7,686,323 B2* | 3/2010 | Chen | 280/642 |
| 7,712,765 B2* | 5/2010 | Chen et al. | 280/642 |
| 7,766,366 B2* | 8/2010 | Li | 280/642 |
| 8,061,732 B2* | 11/2011 | Song et al. | 280/650 |
| 8,251,382 B2* | 8/2012 | Chen et al. | 280/47.41 |
| 2003/0062709 A1* | 4/2003 | Newhard | 280/647 |
| 2007/0069504 A1* | 3/2007 | Lan | 280/642 |
| 2008/0061533 A1* | 3/2008 | Li | 280/642 |
| 2008/0088116 A1* | 4/2008 | Den Boer | 280/650 |
| 2008/0231023 A1* | 9/2008 | Yang | 280/650 |
| 2010/0127480 A1* | 5/2010 | Ahnert et al. | 280/647 |
| 2010/0230933 A1* | 9/2010 | Dean et al. | 280/647 |
| 2010/0244408 A1* | 9/2010 | Dean et al. | 280/647 |
| 2012/0193892 A1* | 8/2012 | Iftinca | 280/647 |

* cited by examiner

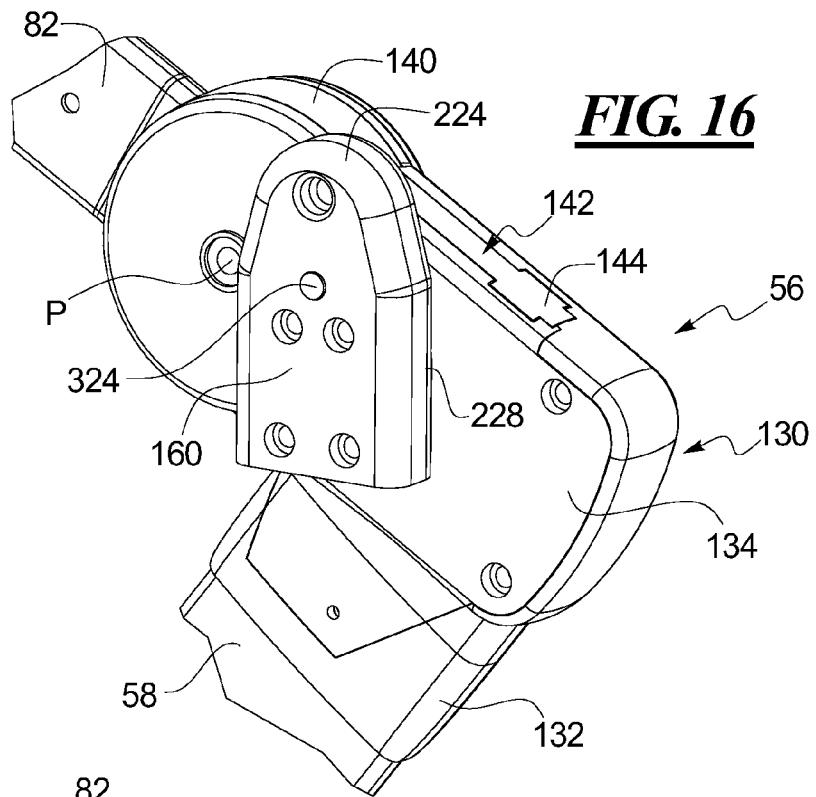
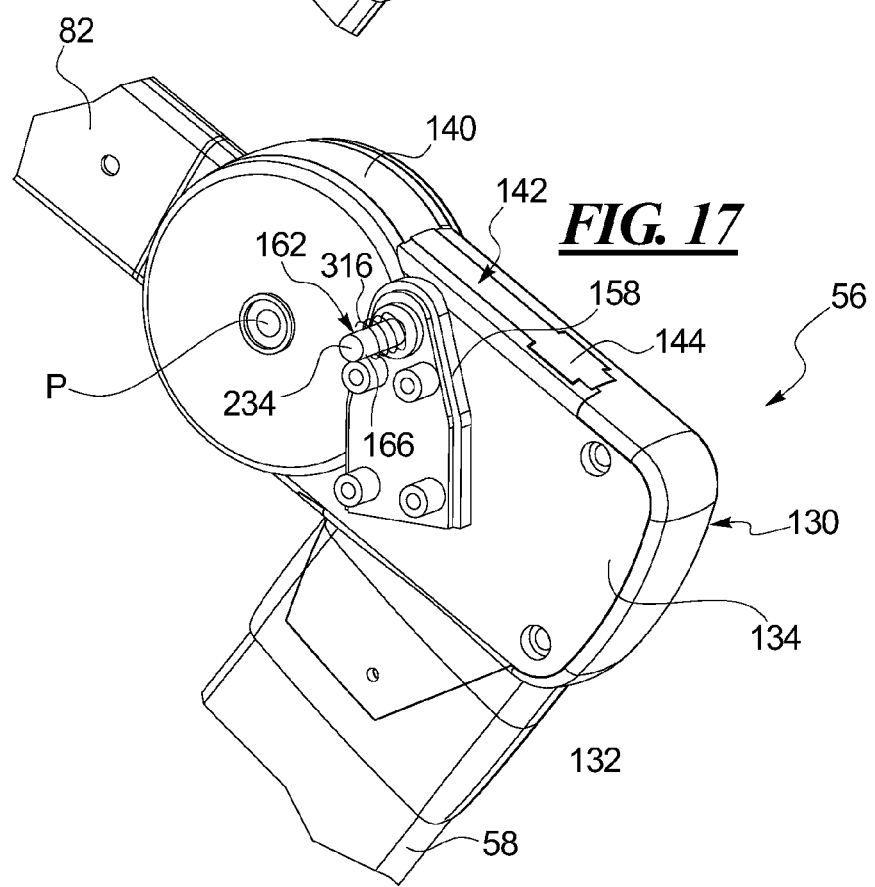

FOLDABLE STROLLER AND FOLD INTERLOCK MECHANISM

BACKGROUND

1. Field of the Disclosure

The present disclosure is generally directed to foldable strollers, and more particularly to a foldable stroller with an interlock device associated with the seat that affects one or more fold functions of the stroller.

2. Description of Related Art

Foldable strollers are known in the art. A typical foldable stroller has a frame assembly and a toddler or child seat supported by the frame assembly. Components of the frame assembly collapse or fold relative to one another when the structure is folded. Most strollers can become unstable during the process of folding if one attempts to use the stroller or the seat. The wheelbase of a typical stroller becomes very short when the frame structure is folded. Some strollers fold in three dimensions and the wheelbase can also become narrower during folding.

Should a caregiver leave their child in the stroller seat when the frame is folded, the child could unintentionally fall and be hurt. Alternatively, the stroller can tip over more easily in a folded or partly folded configuration because it is less stable. Thus, if the caregiver leaves their child in the seat while the frame is folded, or puts their child in the seat before the stroller frame is completely unfolded, the child could fall from the seat or the stroller could tip over. Similarly, should the stroller unintentionally or inadvertently fold or start to fold during use, the child seated in the seat could also fall out of the seat or the stroller can tip over.

SUMMARY

A foldable stroller has a frame assembly with a frame fold joint and is reconfigurable between an in-use configuration and a folded configuration. A child support structure is repositionable between a usable state on the frame assembly in the in-use configuration and an unusable state not suitable to support a child on the frame assembly. An interlock mechanism cooperates with the child support structure and is movable between a locked state preventing the frame assembly from being folded from the in-use configuration to the folded configuration and an unlocked state permitting the frame assembly to be folded. With the frame assembly in the in-use configuration and the child support structure on the frame assembly in the usable state, the interlock mechanism is retained in the locked state. The interlock mechanism is unlocked when the child support structure is moved to the unusable state.

In one example, the child support structure is a seat assembly.

In one example, the child support structure is attached to a mounting point on the frame assembly in a usable state and is detached from the mounting point and removed from the frame assembly in an unusable state.

In one example, the child support structure has a movable part that is pivotable relative to the frame assembly from a usable state to an unusable state on the frame assembly.

In one example, the child support structure is a seat assembly with a seat back part and a seat bottom part. The seat back part is pivotable relative to the seat bottom part and the frame assembly from a usable state to a folded seat position in an unusable state on the frame assembly.

In one example, the foldable stroller has a fold latch on the frame fold joint movable from a frame latched position with the frame assembly in the in-use configuration to a released position.

In one example, the interlock mechanism in a locked state can be arranged to lock a fold latch of the frame fold joint in the latched position and in an unlocked state can be arranged to unlock the fold latch in the latched position.

In one example, the foldable stroller has a pair of frame sides that are laterally spaced apart from one another on the frame assembly, a pair of frame fold joints, one on each of the frame sides, a pair of fold latches, one on each of the frame fold joints, and a pair of the interlock mechanisms, one on each of the frame fold joints.

In one example, a foldable stroller has a frame assembly with a frame fold joint and is reconfigurable between a set-up configuration and a folded configuration. A mounting point is provided on the frame assembly. A child support structure is attachable to the frame assembly at the mounting point and is detachable from the mounting point and removable from the frame assembly. An interlock mechanism is coupled to the mounting point and movable between a locked state locking the frame assembly in the set-up configuration and an unlocked state permitting the frame assembly to fold to the folded configuration. With the frame assembly in the set-up configuration and the child support structure attached to the mounting point, the interlock mechanism is retained in the locked state. The interlock mechanism is unlocked when the child support structure is detached from the mounting point.

In one example, the child support structure is a seat assembly and the interlock mechanism is unlocked when the seat assembly is detached from a mounting point on the frame assembly and removed from the stroller.

In one example, the interlock mechanism has a lock pin projecting from a connector on the mounting point. With the frame assembly in the set-up configuration and the child support structure attached to the mounting point, the lock pin is pushed into the connector in the locked state.

In one example, upon removal of the child support structure from the frame assembly, a lock pin extends outward from child support structure connector in the unlocked state.

In one example, the interlock mechanism is retained in the unlocked state unless the frame assembly is in the set-up configuration. In one example, the interlock mechanism in the unlocked state prevents attaching the child support structure to a mounting point on the frame assembly.

In one example, a foldable stroller has a frame assembly with a frame fold joint and is reconfigurable between an in-use configuration and a folded configuration. A child support device on the frame assembly has a part that is movable relative to the frame assembly between an in-use position and a folded position on the frame assembly rendering the child support device unsuitable to support a child. An interlock mechanism is movable between a locked state locking the frame assembly in the in-use configuration and an unlocked state permitting the frame assembly to fold to the folded configuration. With the frame assembly in the in-use configuration and the child support structure in the first position, the interlock mechanism is retained in the locked state. The interlock mechanism is unlocked by moving the movable part to the second position.

In one example, the child support structure is a seat assembly having a seat back part and a seat bottom part. The seat back part can be pivotable relative to the seat bottom part from an in-use position to a folded position.

In one example, a movable part of the child support structure pivots relative to the frame assembly from an in-use position to a folded position.

In one example, the interlock mechanism has an interlock plate carried on the child support structure and is rotatable about a pivot axis. An opening in the interlock plate rotates with the interlock plate from a locking orientation to an unlocking orientation as a movable part of the child support structure is moved to the folded position.

In one example, the interlock mechanism has a lock pin arranged to bear against an interlock plate and lock the frame fold joint in the locked state and to move into an opening in the plate thereby releasing the frame fold joint in the unlocked state.

In one example, the interlock mechanism in the unlocked state retains the child support device in a folded position.

In one example, the interlock mechanism is in the unlocked state unless the frame assembly is in the in-use configuration and the frame fold joint is latched.

BRIEF DESCRIPTION OF THE DRAWINGS

Objects, features, and advantages of the present invention will become apparent upon reading the following description in conjunction with the drawing figures, in which:

FIG. 16 shows a close-up inside view of the fold joint in FIG. 15 with the seat assembly components hidden to expose a seat connector and shell cover.

FIG. 17 shows the fold joint in FIG. 16 with the seat connector shell cover hidden.

DETAILED DESCRIPTION OF THE DISCLOSURE

The disclosed foldable stroller assemblies solve or improve upon one or more of the above-noted and/or other problems and disadvantages with prior known strollers. In one example, a foldable stroller assembly is disclosed that has a removable and reversible seat, but not a foldable seat. The disclosed seat assembly in this example must be removed prior to folding stroller frame. The disclosed stroller assembly in this example has an interlock mechanism or device that prevents folding of the stroller frame while the seat assembly is attached. In one example, the fold latch is prevented from being released until the seat assembly is removed. The seat assembly in this example also may not be reattached to the stroller frame while the frame is in the folded configuration. The interlock device in one example prevents the seat assembly from being reattached until the stroller frame is unfolded to the set-up configuration. In one example, a stroller assembly is disclosed that has a foldable seat assembly that may also be optionally removable and/or reversible. The disclosed stroller assembly in this example has an interlock device that prevents folding of the stroller frame while the seat assembly is in a completely unfolded orientation. In one example, the fold latch is prevented from being released until the seat assembly is completely folded. The seat assembly in this example also may not be unfolded while the frame is in the folded configuration. The interlock device in one example prevents the seat assembly from being unfolded until the stroller frame is completely unfolded to the set-up configuration.

In each of the disclosed examples, the seat assembly is not available on the stroller assembly for a child to sit on unless the stroller frame is in the set-up and latched configuration. In one of the disclosed examples, the seat assembly must be removed from the stroller in order to fold the stroller and cannot be replaced on the stroller until the stroller is again unfolded to its set-up configuration and latched. In one of the disclosed examples, the seat assembly must be folded in order to fold the stroller frame and cannot then be unfolded until the stroller frame is first unfolded to its set-up configuration and latched.

Figure 1:
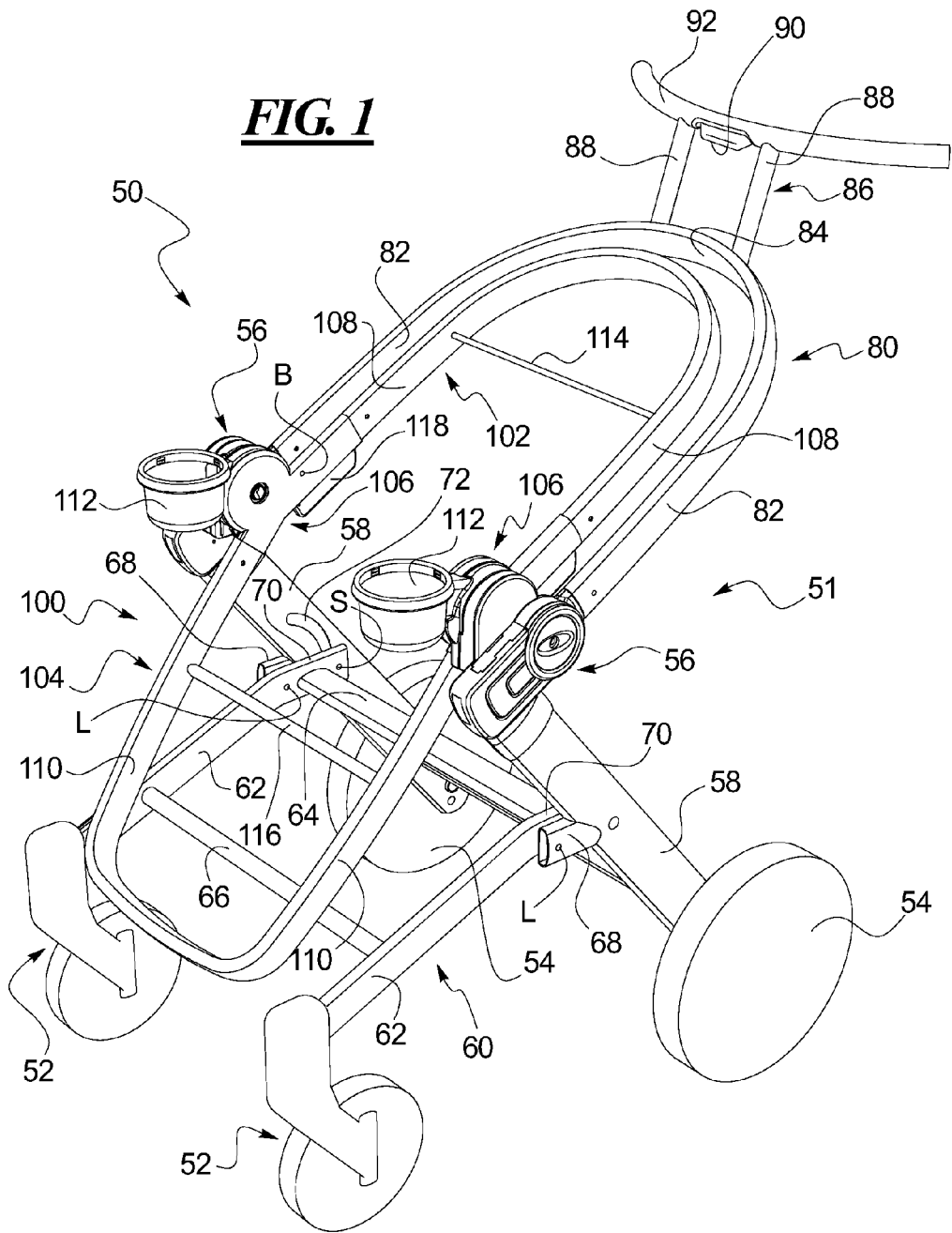
FIG. 1 shows a perspective view of one example of a stroller assembly without soft goods, constructed in accordance with the teachings of the present invention, and in a set-up or in-use configuration.

Turning now to the drawings, FIG. 1 shows one example in perspective view of a foldable stroller assembly 50 constructed in accordance with the teachings of the present invention. As described below, the stroller assembly 50 is reconfigurable between an in-use or set-up configuration and a folded or compact configuration. The disclosed stroller assembly 50 utilizes but one of many alternate stroller frame shapes and configurations that could be employed within the spirit and scope of the present invention. In the disclosed example, the stroller assembly 50 has a frame assembly 51 supported by a pair of front wheels assemblies 52 and a pair of rear wheels 54 as can be generally known in the art. In this example, the frame assembly 51 has a pair of opposed frame sides, each with a pivotable frame fold joint 56 interconnecting various components of the frame assembly. Each frame side in this example has a rear leg 58 laterally spaced from the other and extending down and angled rearward from the corresponding fold joint 56 on the respective side. A lower end of each rear leg 58 is coupled in a conventional manner to one of the rear wheels 54.

A foldable stroller is conceivable that has a different frame structure with no distinct pair of frame sides. It is also conceivable that the disclosed invention could be employed on a stroller with only one frame fold joint or more than two frame fold joints. As noted below, it is also conceivable that the disclosed invention could be employed utilizing an alternate child support structure on the frame assembly, other than a toddler or child seat as described with respect to the example herein.

In this example, the frame assembly 51 has a front leg assembly 60 that forms a pair of laterally spaced apart front legs 62. Each front leg 62 extends forward and downward on its respective frame side. Each front leg 62 terminates at a forward end attached in a conventional manner to one of the front wheel assemblies 52. The front leg assembly 60 also includes a transverse cross-bar 64 that interconnects the opposed rear ends of the two front legs 62 and a transverse cross-brace 66 that is located spaced from both the forward and rear ends and that extends transversely between the front legs. Each of the front legs 62 is pivotally coupled at a leg pivot L to a stand-off 68 that projects forward from the respective rear leg 58. A leg stub 70 is formed at the rearward end of each front leg 62 beyond the pivot L. The stub 70 is pivotally connected to the respective rear leg 58 at a pivot S and slidable along a curved track 72 on the inner facing side of the rear leg.

In the disclosed example, the frame assembly 51 also includes a handle assembly 80 extending upward and rearward from the fold joints 56. The handle assembly 80 generally has a pair of laterally spaced apart push bars 82. Each push bar 82 has a lower end joined to a respective one of the fold joints 56. The handle assembly 80 is a continuous U-shaped structure including the two push bars 82 and a curved end bar 84, which extends transversely between and connects the upper ends of the push bars 82. In the disclosed example, a stanchion assembly 86 extends upward and rearward from the end bar 84 of the handle assembly 80. The stanchion assembly 86 has a pair of laterally spaced apart connector columns 88, which project further rearward away from the end bar 84. A latch actuator 90 is positioned between the columns 88. A handle bar 92 or handle is coupled to the distal ends of the columns 88 and spaced from the end bar 84. In this example, the actuator 90 is carried on an underside of the handle bar 92.

In general, the actuator 90 can be pulled by a user inward or upward into the handle bar 92. This movement of the actuator 90 can pull on cables (discussed below) running through the end bar 84 and push bars 82 to the fold joints 56 to release latches in the fold joints. Upon release of the latches, the stroller frame can be folded. The fold joints 56 and release of same is described in greater detail below. In this example, the handle bar 92 is generally C-shaped and has an arcuate or curved configuration. The curvature is arranged so that the handle bar is concave in the direction of the back of the frame assembly 51. Any part of the handle bar 92 may be grasped by the caregiver to push the stroller. In addition, the shape, configuration, and construction of the handle bar 92 and the actuator 90 can vary and yet function satisfactorily for the purposes of the disclosed invention. For example, the handle bar 92 can be a linear element, be a multi-part structure, have an oval hoop shape, employ umbrella-type handles, or be an otherwise complexly curved structure. In addition, the actuator 90 can be placed on the end bar 84, on or between the columns 88, or the like. Further, the actuator 90 can be a rotary action device, a pivoting lever, or the like.

Figure 2:
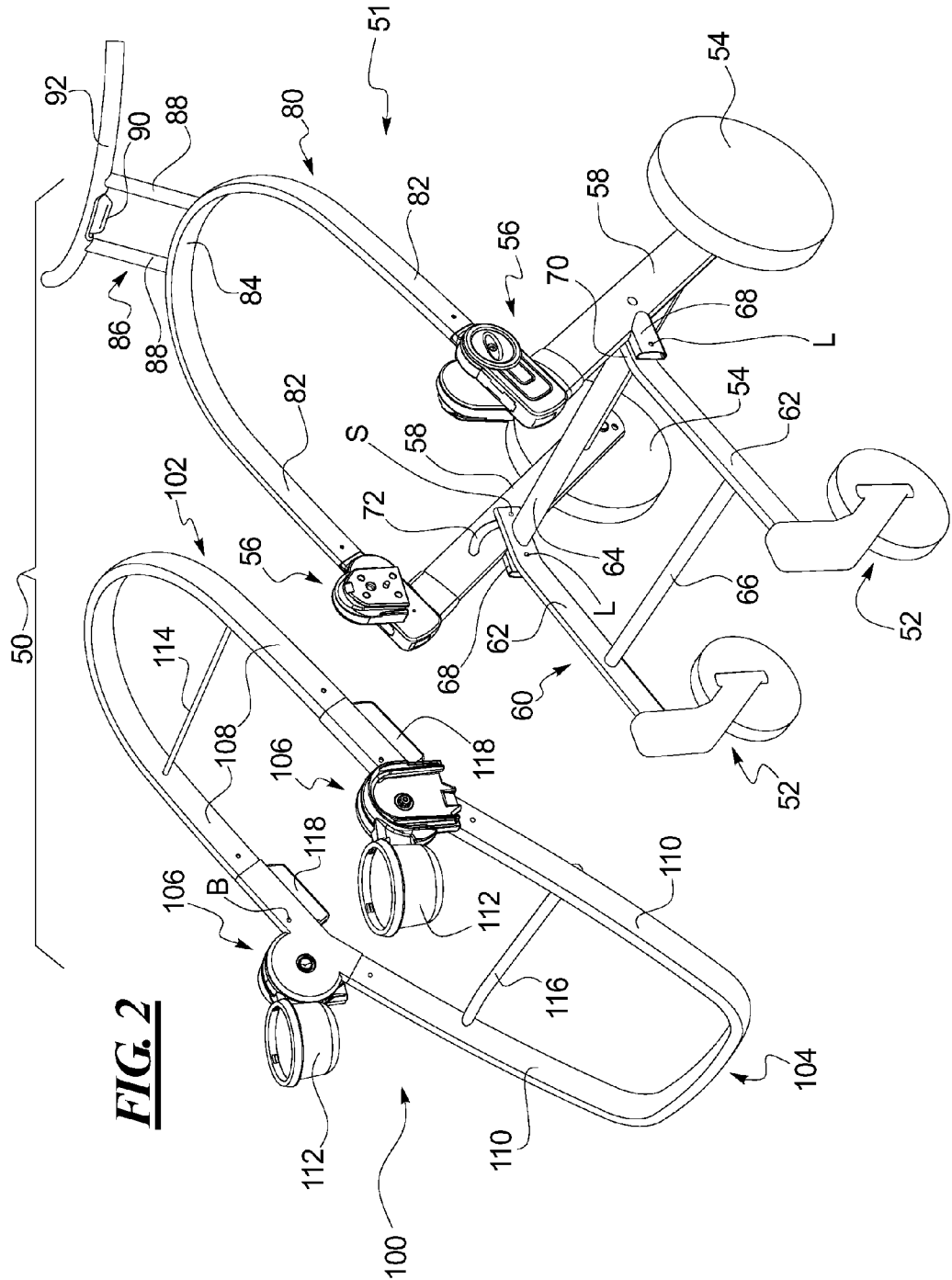
FIG. 2 shows the stroller assembly in FIG. 1 with the seat assembly exploded from the rest of the stroller.

As shown in FIGS. 1 and 2, the stroller assembly 50 in this example has a removable child support structure in the form of a toddler seat or seat assembly 100. In this example, the seat assembly can be attached to and removed or detached from the frame assembly. Thus, the child support structure is repositionable between two positions or states: 1) a usable state or position as a seat to support a child on the frame assembly in the in-use configuration; and 2) an unusable state or position detached or removed from the frame assembly and thus not usable as a seat on the frame assembly. The seat assembly 100 depicted herein is shown without soft goods. In use, the seat would have a seat structure defining a seat back and seat bottom as commonly known in the art for such a toddler-type seat. The seat assembly 100 is removable and reversible in this example and thus can be installed on the stroller assembly in a forward facing or normal use orientation represented in FIGS. 1 and 2 or in a reverse or rear facing orientation where the seat occupant would face rearward toward the handle bar 92. The seat is not shown herein in the reverse orientation but for the purposes of the present invention would function essentially in the same manner. In this example, the seat assembly 100 is not a foldable structure and thus is to be removed prior to folding the frame assembly 51.

The seat assembly 100 is best illustrated in FIG. 2 and has an upper seat frame 102, a lower seat frame 104, and a pair of connecting structures 106. The connecting structures 106 connect the seat frames 102, 104 to one another and also connect the seat assembly 100 to the stroller frame 51. In general, the upper seat frame 102 would support and/or define a seat back part in conjunction with potentially other components of the seat assembly. Similarly, the lower seat frame 104 would support and/or define a seat bottom part in conjunction with potentially other components of the seat assembly. In this example, each of the seat frames is a U-shaped structure that generally follows the contour of the handle assembly 80. The upper seat frame 102 has a pair of spaced apart frame legs 108 that terminate at lower ends, which connect to the respective connecting structures 106. Similarly, the lower seat frame 104 has a pair of spaced apart frame legs 110 that terminate at upper ends, which connected to the respective connecting structures 106.

In the disclosed example, a cupholder assembly 112 is connected to and extends forward from a respective one of the connecting structures 106. These cupholders 112 are optional and can be eliminated or replaced by some other structure, such as an arm bar (see subsequent embodiment), a child tray, or the like. In addition, the upper seat frame 102 has a cross-member 114 extending between the frame legs 108 and the lower seat frame 104 has a similar cross-member 116 extending between the frame legs 110. These cross-members can support portions of a seat back and seat bottom, respectively, during use of the seat assembly and provide rigidity and strength to the overall seat structure. The seat assembly 100 also has a pair of release buttons 118. One of the release buttons 118 is positioned on the underside of each of the connecting structures 106 adjacent the corresponding frame legs 108. As will be described below, the release buttons 118 are actuated to remove the seat assembly 100 from the frame assembly 51 as represented in FIG. 2.

The seat assembly 100, including the seat frames 102 and 104, connecting structures 106, and release buttons 118, can vary in configuration and construction within the spirit and scope of the present invention. The overall shape of the seat can vary. The shape and configuration of the connecting structures 106, as well as the location and function of the release buttons 118, can also vary. In addition, the seat assembly 100 in this example, as well as the seat assembly in the subsequent example disclosed herein, can be replaced by other child support structures. For example, an infant car seat adapter for mounting a car seat, carrier, or carry cot to the frame 51 can be attached in place of the seat assembly 100. Also, a direct mount car seat, carrier, carry cot, or other child support structure and can attached to the frame assembly in the same manner as the seat assembly described below.

Figure 3:
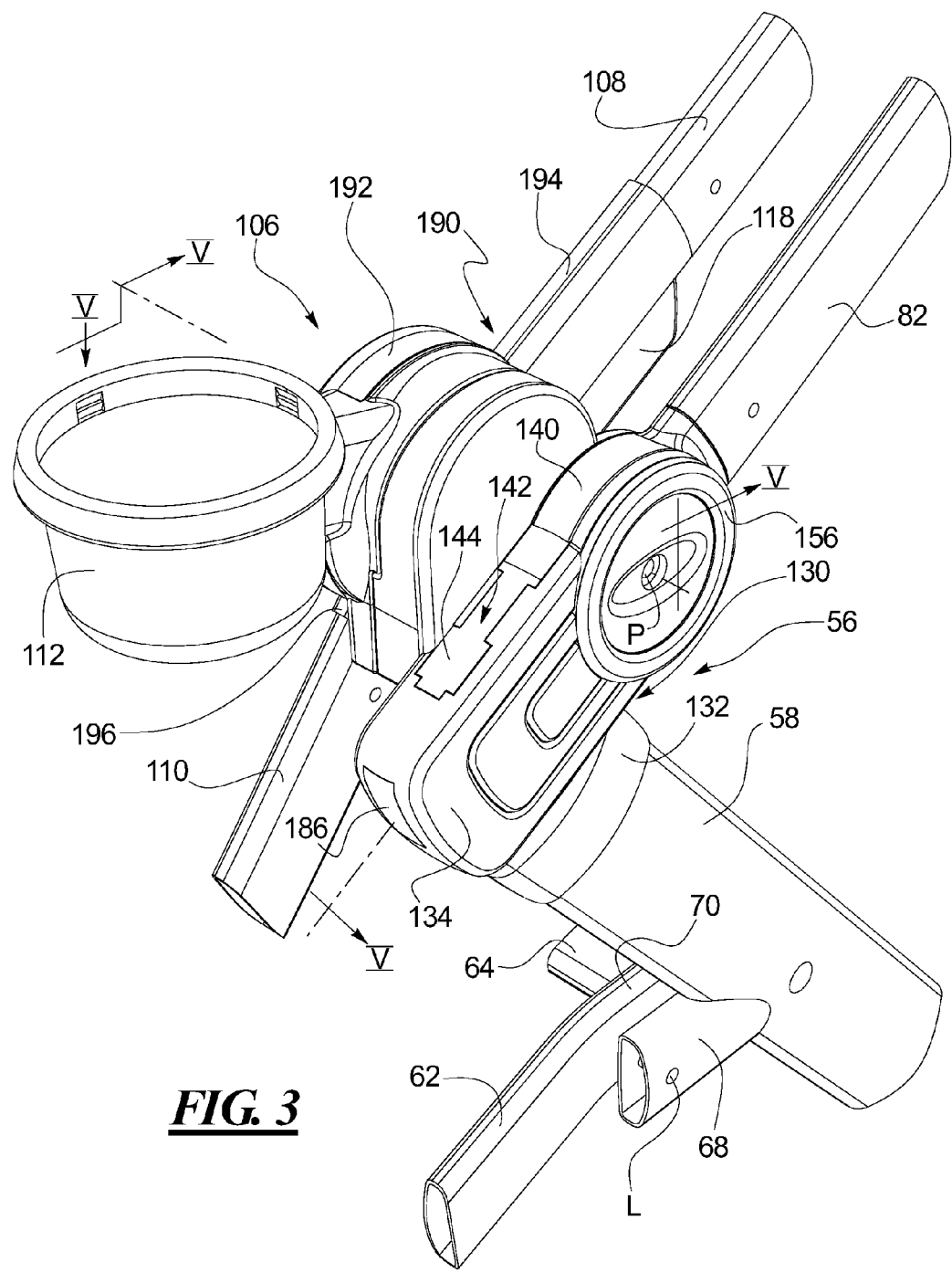
FIG. 3 shows a close-up view of the left side fold joint on the stroller assembly in FIGS. 1 and 2.
Figure 4:
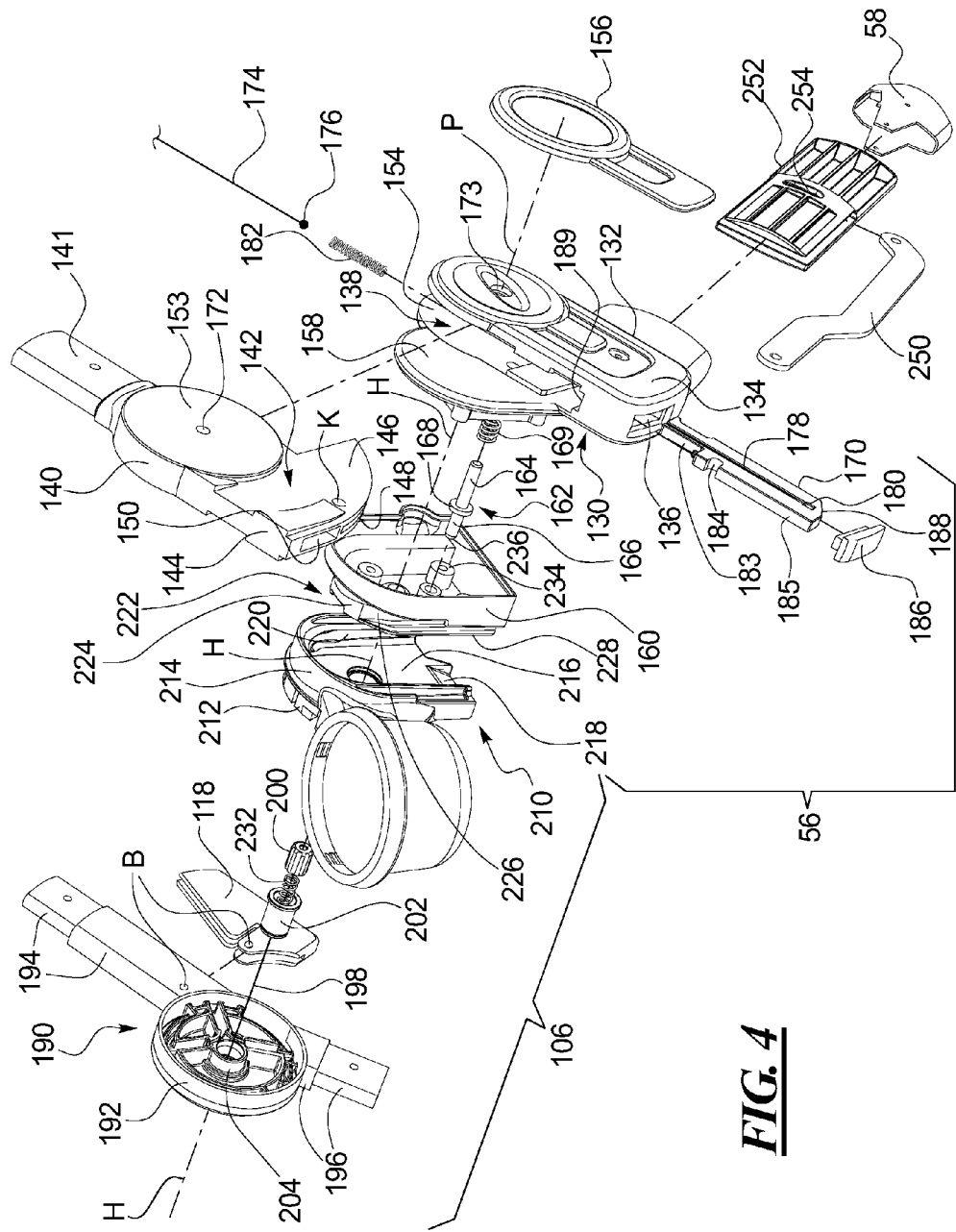
FIG. 4 shows an exploded view of the fold joint in FIG. 3.
Figure 5:
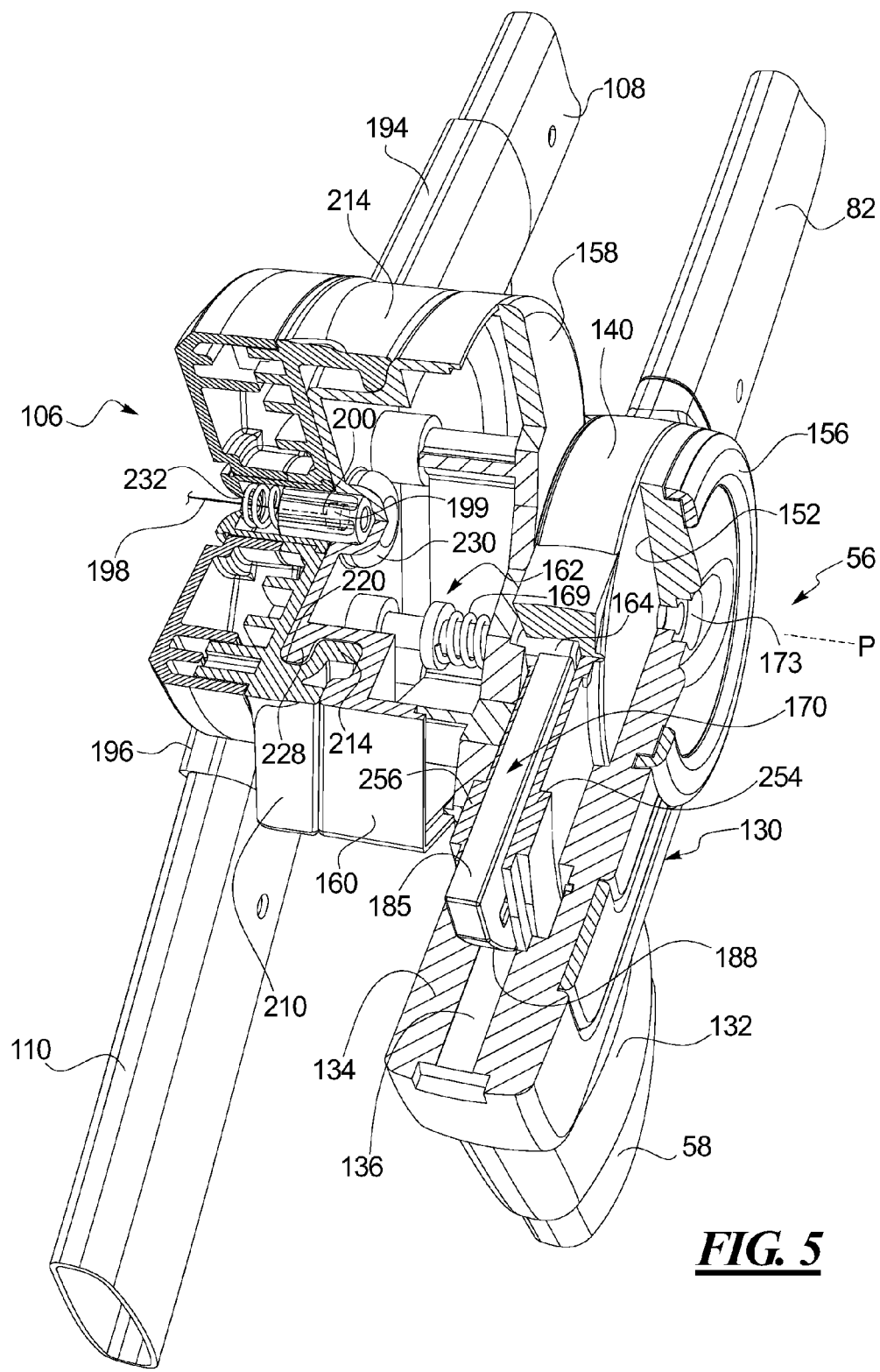
FIG. 5 shows a top outside perspective and fragmentary cross-section view taken along line V-V of the assembled fold joint in FIG. 3 in the set-up configuration.

FIG. 3 shows a close-up view of the left side fold joint 56 of the frame assembly 51 and of the connecting structure 106 of the seat assembly 100. The right side fold joint 56 and connecting structure 106 are essentially identical and thus will not be described in detail. The description of the left side fold joint and connecting structure are equally applicable to the right side joint and structure. FIG. 4 shows an exploded view of the left side fold joint 56 and the connecting structure 106 and depicts the major components for each. FIG. 5 shows a cut-away section of the fold joint 56 and the connecting structure 106. Each of these figures shows the components in the set-up configuration of the stroller assembly as in FIGS. 1 and 2. The terms inward, inner, inside, or the like are used herein to refer to the side of a component positioned, arranged, oriented, or facing the middle of the stroller (i.e., toward the other side of the stroller frame). The terms outer, outward, outside, or the like are used herein to refer to the side of a component positioned, arranged, oriented, or facing the exterior of the stroller frame or away from the stroller.

With reference to FIGS. 3-5, the fold joint 56 generally has a joint housing 130 with a lower connector 132 configured to connect to the rear leg 58. The lower connector 132 forms a fixed joint to the rear leg and maintains a static orientation between the rear leg and the housing 130 in this example. The connection can vary but in one example the rear leg 58 and the lower connector can be telescopically joined and then fastened to one another. The joint housing 130 also has a housing section 134 from which the lower connector 132 extends. The housing section 134 is generally hollow on its interior and defines a lengthwise slot 136 along its length. The joint housing 130 also defines a main pivot axis P extending transversely through the housing. A rear end of the slot 136 enters a space between opposed sides of the joint housing 130 centered on the pivot axis P.

A puck 140 is attached to the lower end of the push bar 82. A hatchet shaped cam 142 extends from an edge of the puck 140 opposite the push bar 82. A top surface 144 of the cam 142 is essentially flat, as are the side surfaces of the cam and the puck 140. An extension of the cam 142 extends downward and defines a curved end surface 148 on the end of the cam and the extension. The curved end surface 148 has a constant radius relative to the pivot axis P in this example. A latch receiving bore 150 is formed into the end surface 148 and extends through the cam 142 and the puck 140 to the push bar 82. The bore 150 is generally aligned with the axis of the push bar 82.

A portion of the joint housing 130 creates a circular outer bearing surface 152 that surrounds the pivot axis P on the outer side of the housing. The outer bearing surface 152 bears against an outer face 153 on the puck 142 when the joint 56 is assembled. A similar inner bearing surface 154 on the housing 130 also surrounds the pivot axis P on the inner side of the housing 130. The inner bearing surface 154 bears against an inner face on the opposite side of the puck 142 in the assembled joint. This space in the housing 130 is defined between the two cam bearing surfaces 152, 154. An outer cover plate 156 can be secured over the exterior surface of the joint housing 130. The cover plate can be for decorative purposes and/or can cover fasteners used to assemble the joint housing 130.

A mounting shell section 158 is carried on a part of the joint housing 130 on the inner side of the housing adjacent the inner bearing surface 154. A shell cover 160 is secured to the shell section 158 and creates a cavity within a shell when assembled. The shell cover 160 defines the inner boundary of the fold joint 56 in this example. The shell section 158 and shell cover 160 contain an interlock or lock pin 162 in the cavity when assembled. The lock pin 162 has a locking end 164 on the outward side and has a contact end 166 on the inward side of the pin. A fixed or integral washer 168 is on the pin shaft and differentiates the two ends of the locking pin. A pin spring 169 is received over the locking end 164 and bears against the washer 168 when assembled. The other end of the pin spring 169 bears against an inside surface of the shell section 158 and biases the lock pin in an inward direction toward the shell cover 160 and through the shell cover.

A latch finger 170 is aligned with and received in the latch bore 150 of the cam 142. A pivot bore 172 is located at the center of the puck 140 and is aligned with the pivot axis P when the joint is assembled. Likewise, a bore 173 is formed through each of the bearing plates also aligned with the axis P and the puck 140 seats in the space 138 between the surfaces 152, 154.

A pull cable 174 with a slug 176 on one end is routed from the actuator 90 through the handle assembly 80 along the push bar 82 and into the joint housing 130. The cable 174 is seated in a cable slot 178 extending lengthwise along the latch finger 170. The slug 176 seats in a slug receiver 180 at the end of the cable slot 178 and secures the cable to the latch finger 170. A latch spring 182 is positioned at a cable end 183 on the latch finger 170 and biases the latch finger in a direction away from the push bar 82 toward the end of the cam 142. The latch finger 170 has a notch 184 formed into a top surface 185 of the finger in this example. A cap 186 covers the open end of the slot 136 in the joint housing 130 opposite the puck 140.

The free end of the latch finger 170 is flat on the top surface 185 and curved on the end and bottom surface 188. With the frame assembly 51 in the set-up configuration, the free end of the latch finger 170 is captured in the slot 136 of the joint housing 130. The flat top surface 185 at the free end will prevent the latch finger 170 from pivoting upward without first being withdrawn to clear the housing body above the slot 136. When the stroller frame 51 is unfolded, the curved bottom surface 188 bears against an edge 189 of the housing body at the end of the space 138. This moves the latch finger 170 against the force of the latch spring 182 and slides from the slot 136. Once in the slot, the latch finger will fire by force of the latch spring 182 back into the slot under the body of the housing 130 and retain the frame assembly in the set-up configuration.

The connecting structure 106 of the seat assembly 100 has a frame connector 190 with a center hub 192, an upper connector 194 extending radially from the hub, and a lower connector 196 extending radially from the hub in a direction generally opposite the upper connector. The upper connector 194 is configured to connect with a free end of the seat frame leg 108. As with the rear leg 58 to housing connector 132 joint described above, the upper connector 194 can vary in construction but in one example can have a portion telescopically received in an open end of the seat frame leg 108. Fasteners can be used to secure the two components. Similarly, the lower connector 196 is configured to connect and fastened to a free end of the seat frame leg 110.

In this example, the release button 118 is received in a slot (not shown) under the upper connector 194 and is an elongate lever. The release button 118 is pivotally connected at one end at a pivot B to the connector 194. When one end of the button is drawn upward into the upper connector, the other end pulls downward on a release cable 198. A free end of the release cable 198 is secured via a slug 199 to a splined shaft 200 that is slidably received in a bushing 202. A center axis H of the hub 192 is offset relative to the main pivot axis P but could be coaxial. The shaft 200 and bushing 202 are aligned on the same axis H. The bushing 202 is seated in a well 204 on an interior surface of the center hub 192. The axis P is generally perpendicular to the frame connectors 194, 196, as is the axis H.

A seat mount 210 has an inner side 212 secured to the center hub 192. The seat mount 210 has an outer side with an inverted U-shaped perimeter wall 214 that surrounds on three sides a generally flat face 216 of the mount. The perimeter wall 214 is open at the bottom of the seat mount. A chamfer or ramp 218 is disposed at an open bottom edge of the flat face 216. Opposed guide grooves or undercuts 220 are formed on each of the linear portions of the perimeter wall 214. A seat connector 222 projects from the exterior but inner facing side of the shell cover 160. In this example, the seat connector defines a mounting point for the seat assembly 100 or other child support structure. The connector 222 is complementary shaped to engage the seat mount 210 with a rounded top 224 and linear sides 226. Each linear side has a rib or track 228 that seats in a corresponding one of the grooves 220 on the seat mount 210 when the seat mount is lowered onto the connector 222.

The cupholder 112 is connected in this example to the seat mount 210 but can be eliminated or attached to another component such as one of the frame connectors 194, 196 or the center hub 192. The cupholder 112, or a portion thereof, can be integrally formed as a part of one of these components or can be separately attached.

As shown in FIG. 5, the frame assembly 51 in this example cannot be folded with the seat assembly 100 installed on the stroller. The lock pin 162 acts as an interlock mechanism, or at least part of same, and cooperates in this example with the seat mount to prevent actuation of the fold latch and particularly the latch finger 170. The exposed end of the splined shaft 200 seats in a blind bore or receptacle 230 formed into an inner surface of the seat connector 222 on the shell cover 160 when the seat mount 210 is connected to the seat connector. A shaft spring 232 biases the shaft 200 in an outward direction into the receptacle 230 to retain the seat assembly 100 mounted to the frame assembly 51. The contact end 166 of the lock pin 162 extends through the shell cover 160 via a bore surrounded by a pin guide 234. With the stroller frame in the set-up configuration and the seat assembly 100 mounted to the joint 56, the flat face 216 on the mount 210 bears against the contact end 166 of the pin 162 and forces the pin outward against the force of the pin spring 169. In this locked state or position, the locking end 164 of the pin 162 is seated in the notch 184 in the latch finger 170. With the seat assembly 100 mounted to the stroller, the latch finger 170 cannot move. Even if the user were to attempt to actuate the actuator 90, which would pull on the cable 174 and the latch finger 170, the pin 162 would prevent movement of the latch finger.

Figure 6:
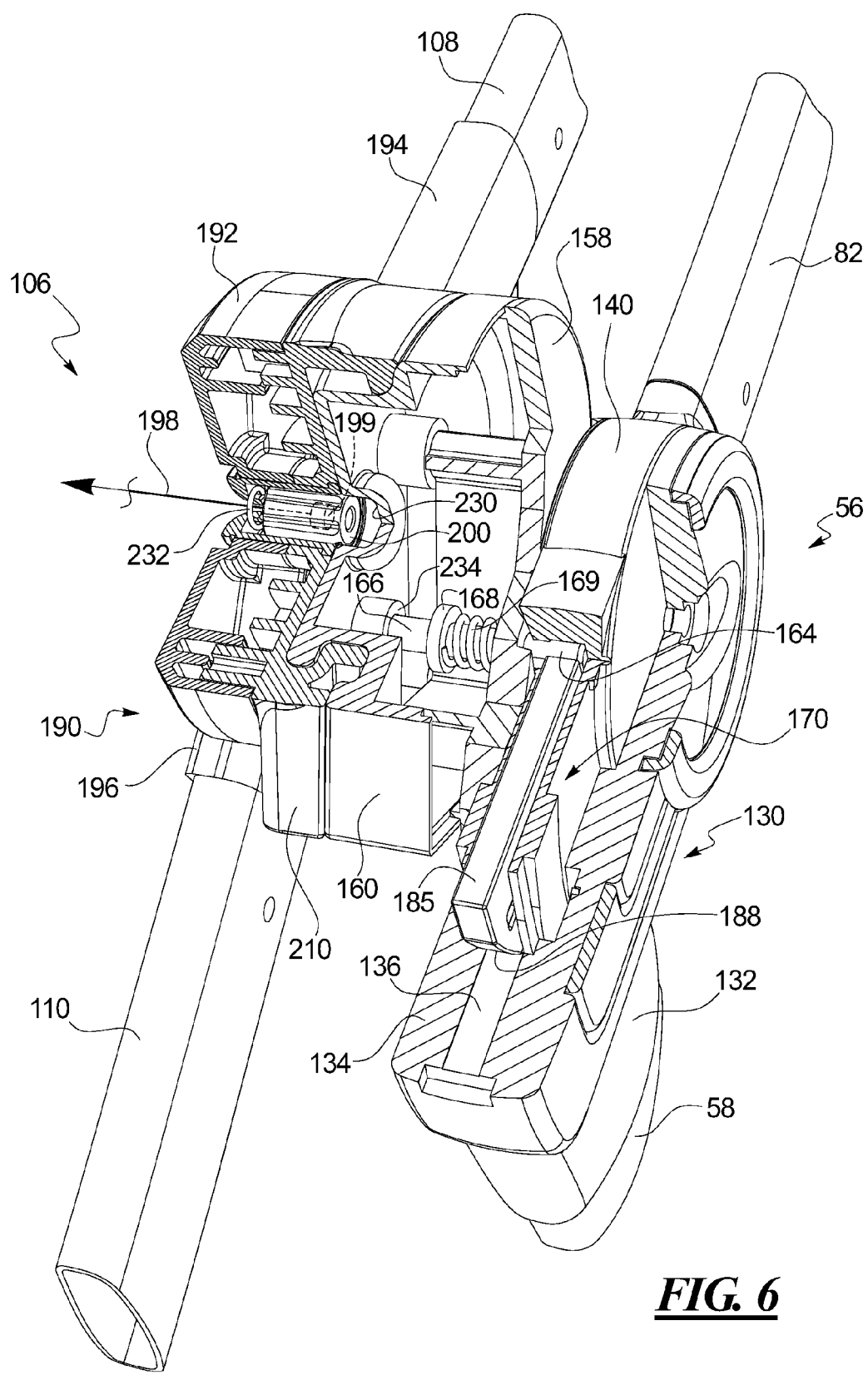
FIG. 6 shows the fold joint in FIG. 5 upon actuation of the seat assembly release button.
Figure 7:
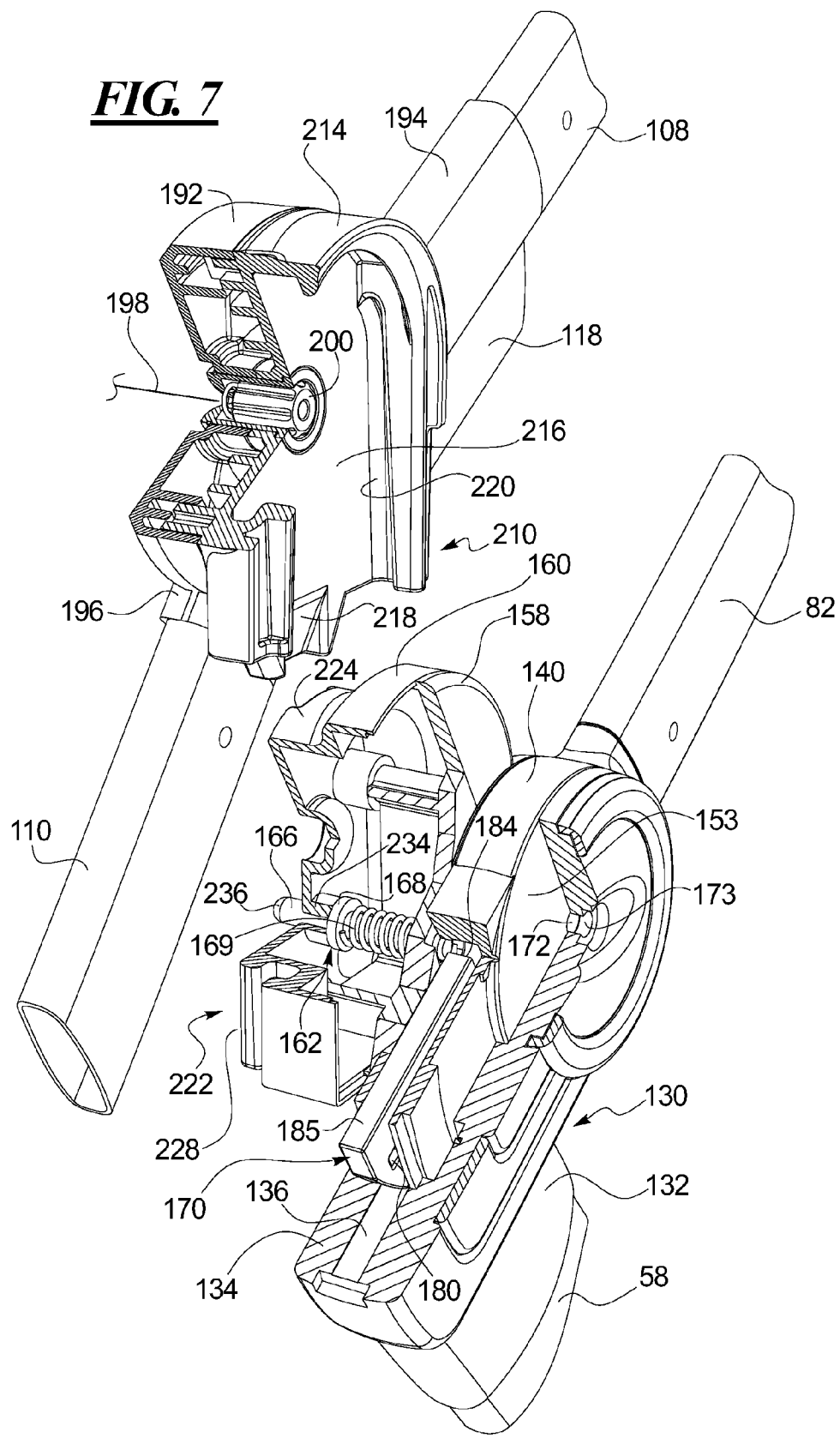
FIG. 7 shows the fold joint in FIG. 6 with the seat assembly removed as represented in FIG. 2.
Figure 8:
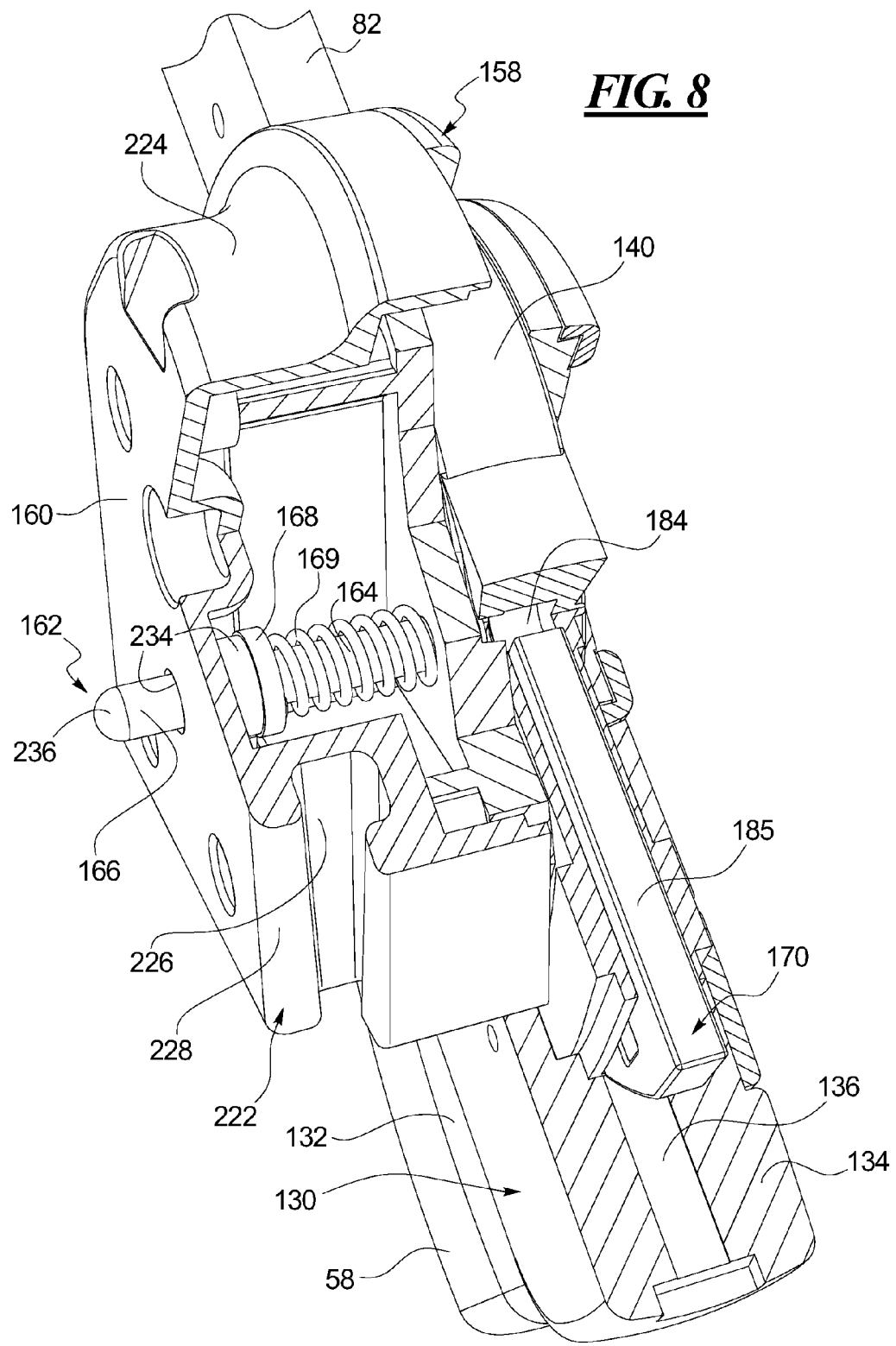
FIG. 8 shows a top inside perspective view of the fold joint in FIG. 7.
Figure 9:
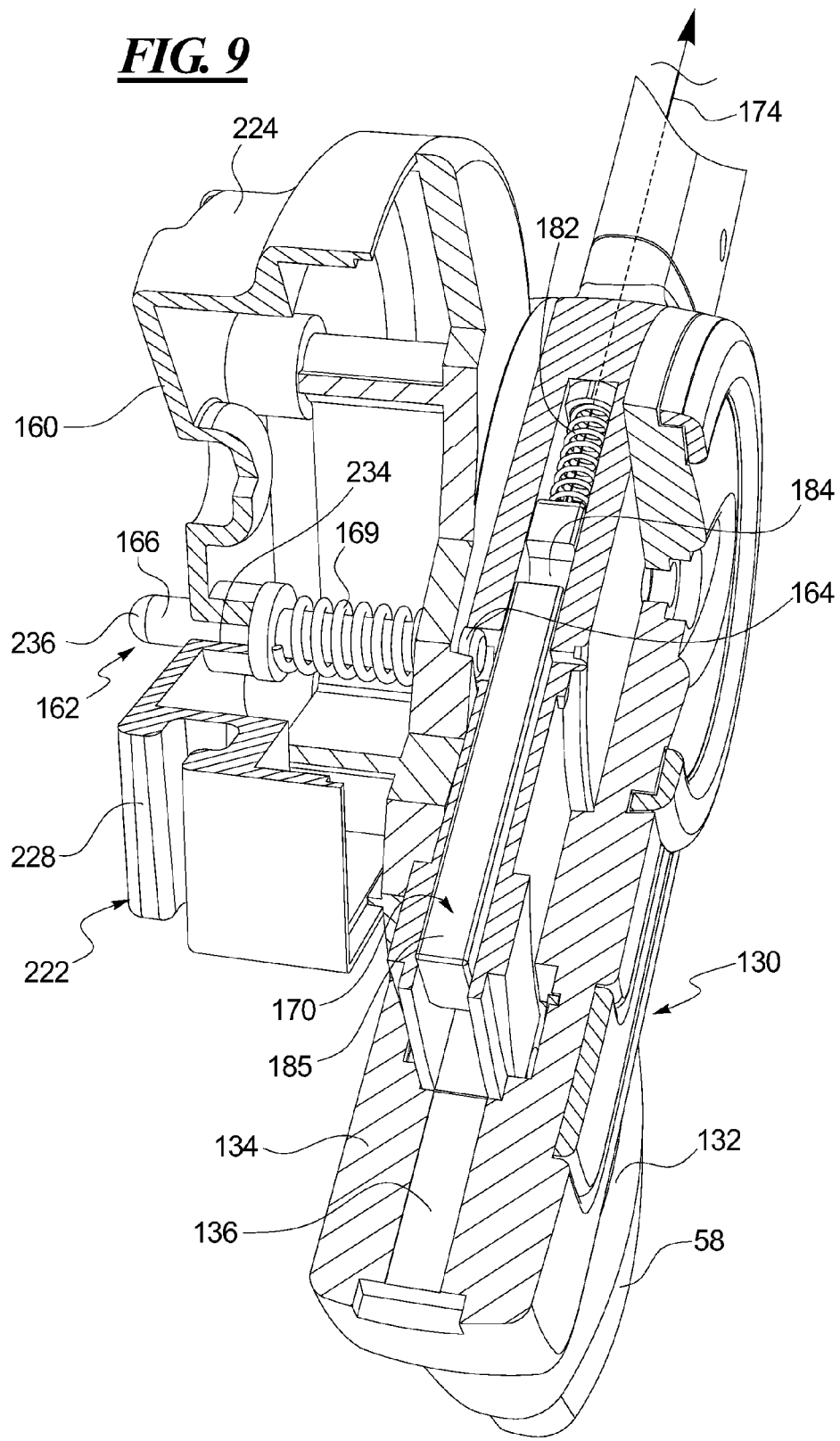
FIG. 9 shows the fold joint in FIG. 7 with the fold latch in a released position.

In order to fold of the frame assembly 51, a user must first remove the seat assembly 100 from the stroller. To do so, a user pulls upward on the release button 118, which pulls on the release cable 198. The cable 198 withdraws the splined shaft 200 from the receptacle 230 against the force of the shaft spring 232. This arrangement of the connecting structure and joint is shown in FIG. 6. Once the splined shaft 200 is clear of the receptacle 230, the seat mount 210 can be lifted from the seat connector 222 on the shell cover 160. When the flat face 216 of the seat mount 210 clears the contact end 166 of the lock pin 162, the pin spring 169 fires the lock pin inward through the bore and guide 234. The contact end 166 then protrudes inward from its bore in the shell 160 and the locking end 164 withdraws from the latch finger notch 184. This unlocked state or position is shown in FIGS. 7 and 8. With reference to FIG. 8, the tip 236 on the contact end 166 of the lock pin 162 is rounded for purposes to be discussed shortly hereafter.

Figure 10:
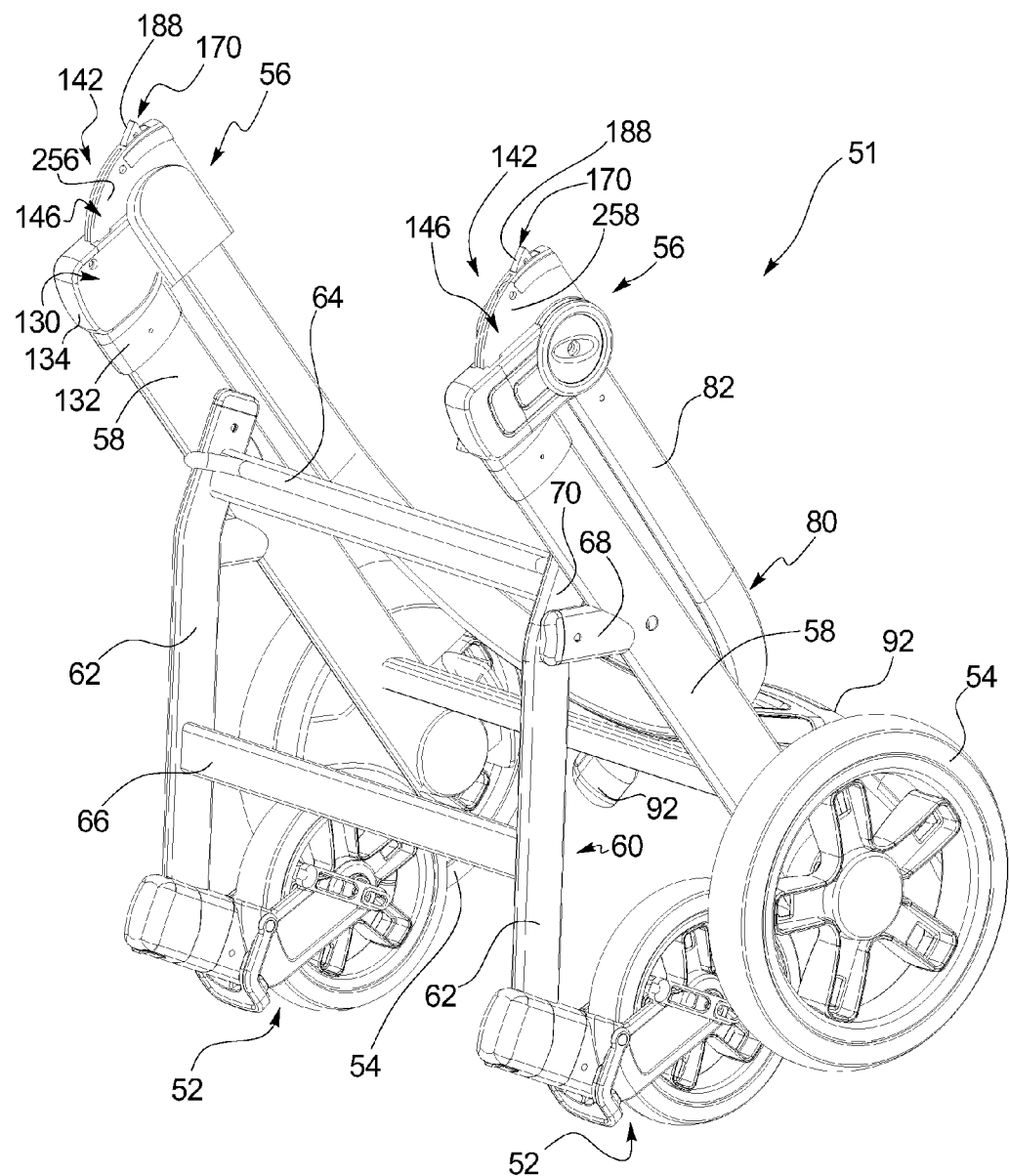
FIG. 10 shows the stroller assembly in FIG. 2, minus the seat assembly, and in a folded configuration.

With the pin 162 free of the notch 184 in the latch finger 170, the user is then free to manipulate the actuator 90, which in turn pulls on the cable 174. The cable withdraws the latch finger 170 toward the push bar 82 against the force of the latch spring 182. As described above, the free end of the latch finger 170 clears the housing body within the slot 136 allowing the fold joint 56 to pivot or fold. FIG. 10 shows the frame assembly 51, minus the seat assembly 100, in the folded configuration. To fold the stroller frame, the user pushes the handle assembly 80 downward toward the rear leg 58 to fold the frame. The handle assembly 80 and particularly the push bar 82, pivots about the main pivot axis P on the fold joint 56.

Figure 11:
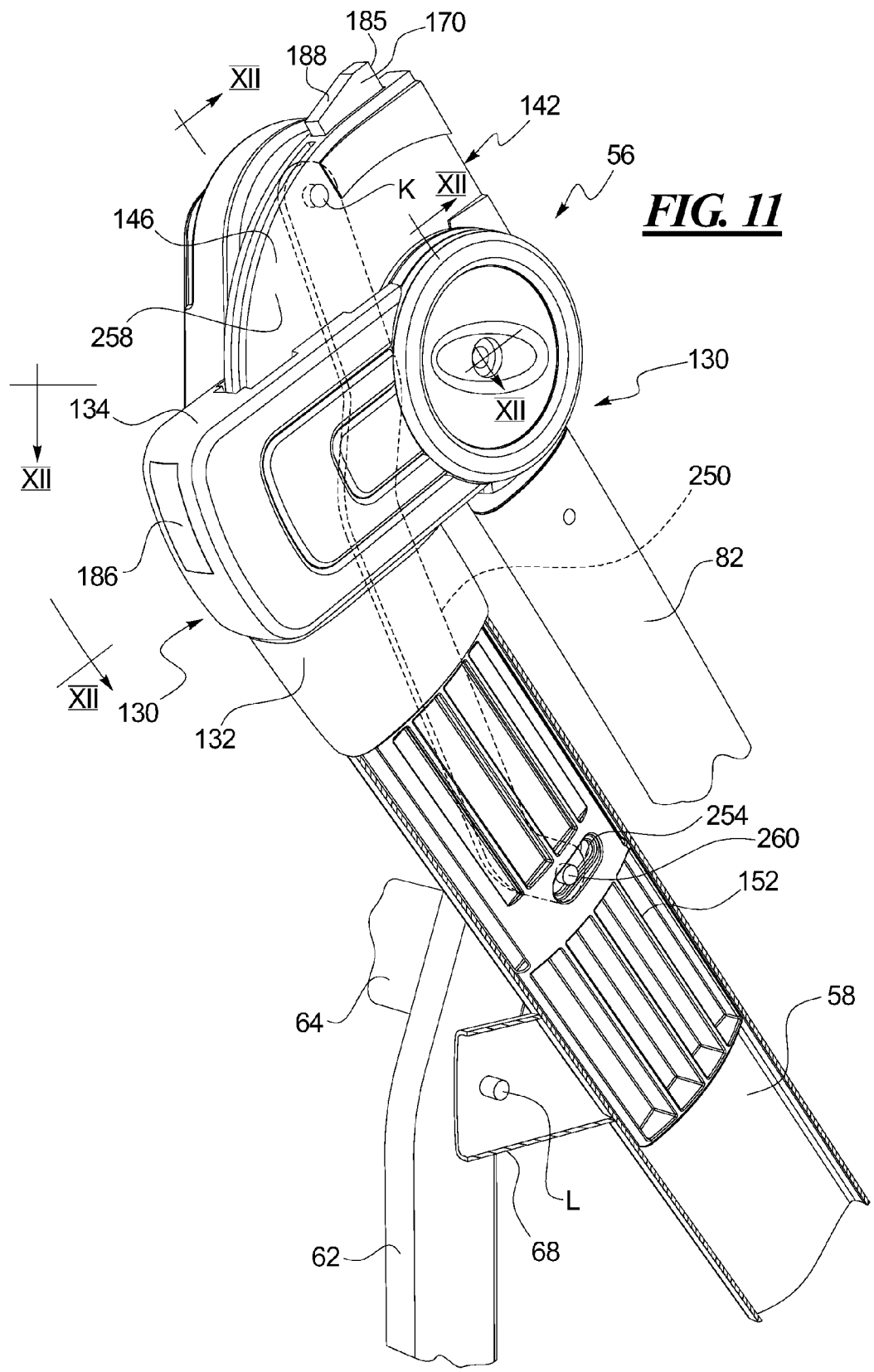
FIG. 11 shows the fold joint in FIG. 3, but in the folded configuration of FIG. 10, and with some parts cut away or shown in phantom view.
Figure 12:
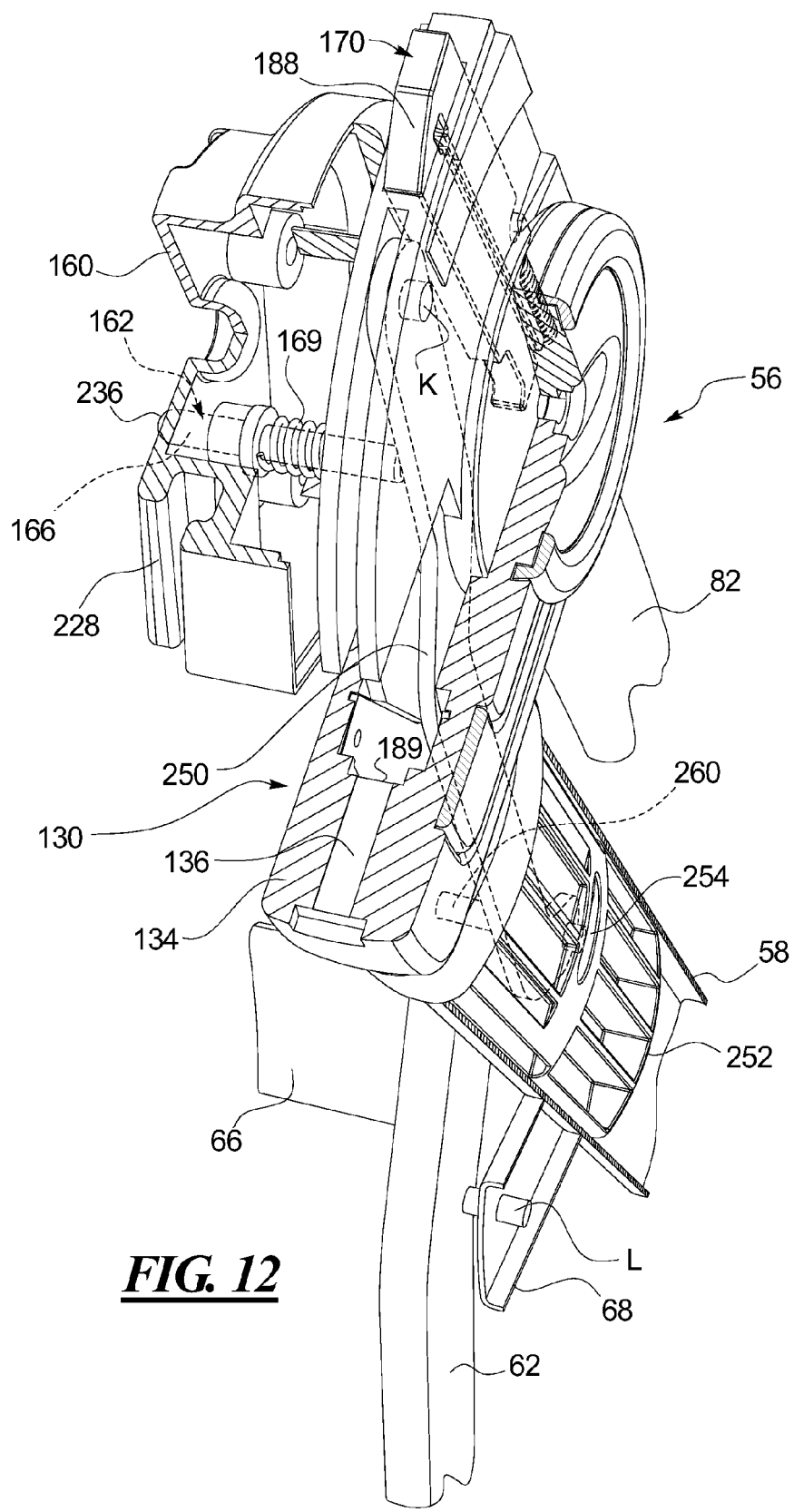
FIG. 12 shows a top outside perspective and fragmentary cross-section view taken along line XII-XII of the fold joint in FIGS. 10 and 11.

With reference to FIGS. 4, 11, and 12, a fold link 250 is housed within the rear leg 58 with a lower end pivotally connected to a slidable shuttle 252 also housed with the rear leg. The pivotal connection of the link 250 to the shuttle 252 at this end is within a slot 254 in the shuttle. The slot 254 is oriented normal or perpendicular to a lengthwise axis of the rear leg 58. The other end of the link 250 is pivotally coupled to the cam 142 at a pivot K just below the latch bore 150. The cam 142 in this example has two spaced apart cam plates including an inner plate 256 and an outer plate 258. The link 250 is movably positioned in the gap between the two plates 256, 258. As the user pushes down on the handle assembly 80, the cam 142 pivots upward about the axis P. This pulls the link 250 upward, which in turn pulls the shuttle 252 upward within the rear leg 58.

A shuttle pin 260 is seated in the slot 254. The pin 260 connects the lower end of the link 252 to the shuttle and connects the stub end 70 of the front leg 62 to the shuttle. The front leg 62 pivots about the pivot L downward and inward toward the rear leg 58. The shuttle pin 260 is pulled upward along the curved track 72 on the interior side of the rear leg (see FIGS. 1 and 2). The shuttle slot 254 allows lateral movement of the pin 260 to follow the curved track 72. Both the link 250 and the stub end 70 of the front leg thus ride along the track 72 and pivot about the pivot S, which is defined by the pin 260. As a result of pushing down on the handle assembly 80, the front leg 62 pivots downward and inward toward the rear leg 58 and the handle assembly 80 pivots downward toward the rear legs to the compact folded configuration in FIG. 10.

FIGS. 11 and 12 show a close-up view of the fold joint 56 and associated frame and link components in the folded configuration. With the frame assembly in the folded configuration of FIG. 10, the seat assembly 100 cannot be reinstalled because the interlock mechanism is retained in the unlocked state, preventing attachment of the seat mount 210. The contact end 166 of the lock pin 162 blocks attachment of the seat mount 210 to the seat connector 222. The locking end 164 of the lock pin 162 is borne against a side face of the cam 142 (see FIG. 12 and FIG. 29 for reference) and is blocked from outward movement. The frame 51 must first be unfolded to the set-up configuration in FIG. 2 and the latch must then be latched. Once in this configuration, the notch 184 and the pin are aligned with one another. The seat mount 210 can then drive the locking pin 162 against the biasing force of the spring 169 back into the notch 184 of the latch finger 170. The pin and notch will align when the latch finger 170 fires back into the slot 136. Prior to being aligned with the notch 184, the pin cannot be moved back into the locked position and thus, would continue to block attachment of the seat assembly to the folded frame.

Figure 13:
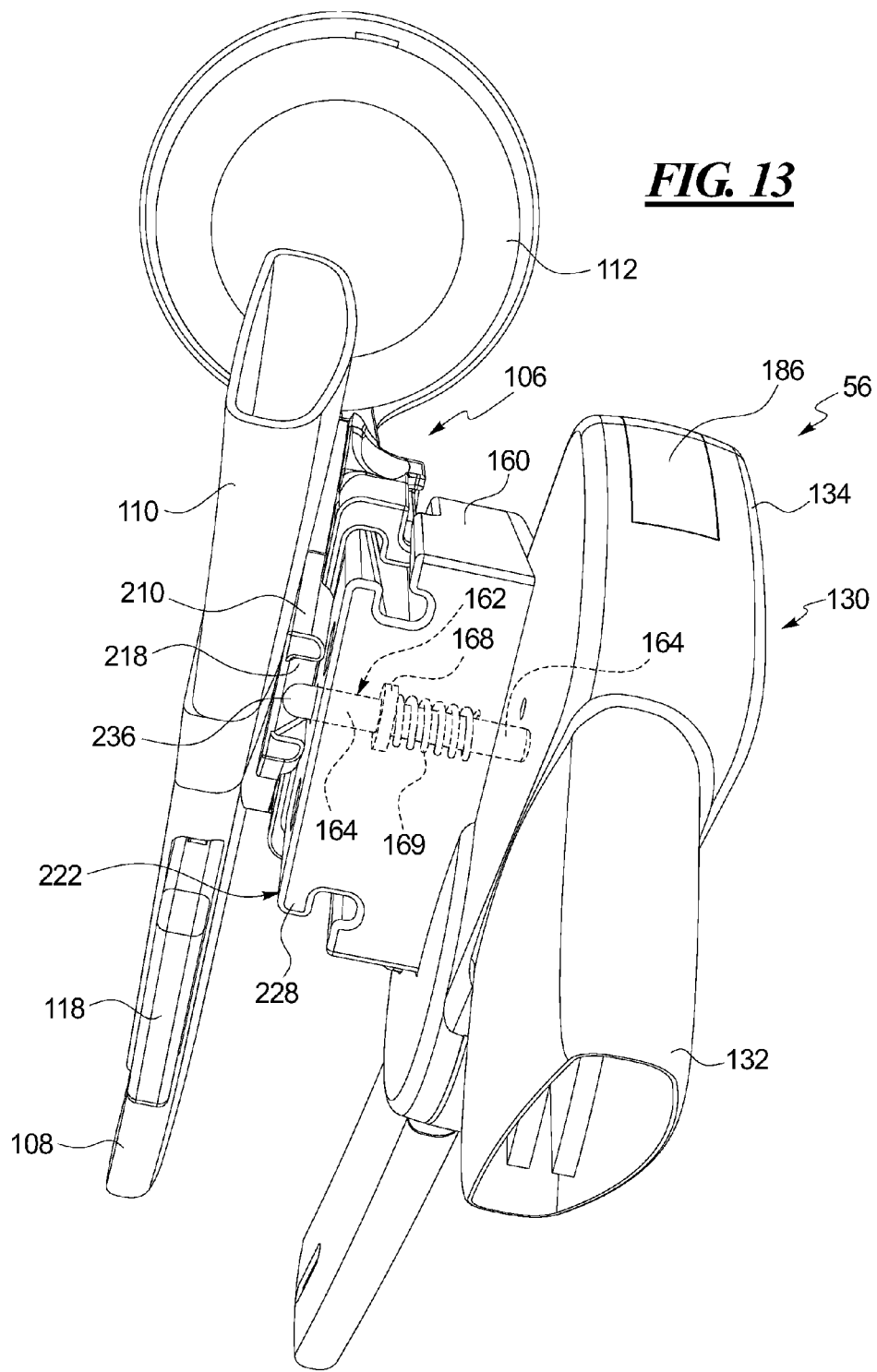
FIG. 13 shows a bottom and inside perspective view of the fold joint in FIGS. 2, 7, and 8 in the set-up configuration and with the seat positioned for attachment on the stroller assembly.

When the stroller frame is returned to the unfolded set-up configuration and the fold joints latch, the seat assembly 100 can be attached. FIG. 13 shows a bottom view of the fold joint 56 and connecting structure 106. The ramp 218 of the seat mount 210 is aligned with the contact end 166 on the pin 162. The rounded tip 236 engages the ramp 218 as the seat assembly 100 is pushed downward. The ramp 218 will push the pin 162 inward against the bias force of the pin spring 169 as the seat mount 210 is pushed down. Once aligned, the splined shaft 200 will fire into the receptacle 230 by force of the shaft spring 232 to secure the seat assembly in place.

In the above example, the interlock mechanism incorporates the ramp 218 and face 216 of the seat mount 210, the locking pin 162, the pin spring 169, features of the shell cover 160, a face of the cam 142 (FIGS. 12 and 29), and the notch 184 in the latch finger 170. The frame assembly 51 cannot be folded without first removing the seat assembly because the interlock mechanism locks the fold latch, i.e., the finger 170 in this example. Once the seat assembly is removed and thus in an unusable state, the interlock mechanism fires to the unlocked state or position. This in turn unlocks the latch finger so that the fold joint 56 can be folded. The seat assembly 100 cannot be installed on the frame assembly while the frame assembly is folded. The interlock mechanism prevents such seat reattachment. The frame assembly must first be unfolded to the set-up and latched configuration. Once unfolded, set-up, and latched, the seat assembly 100 can be reattached to the frame assembly in a usable state.

Figure 14:
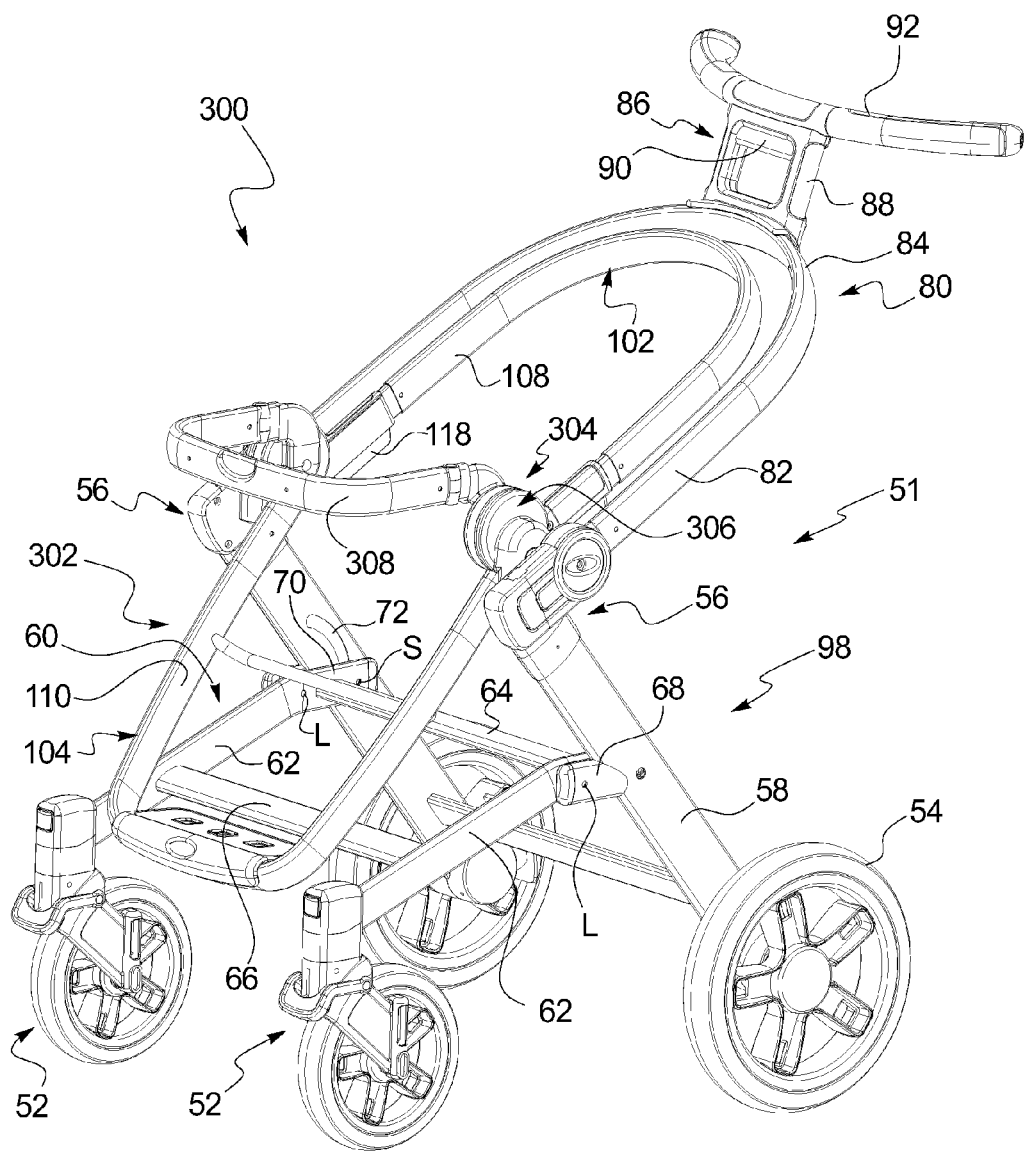
FIG. 14 shows a perspective view of another example of a stroller assembly constructed in accordance with the teachings of the present invention, without soft goods, and in a set-up configuration.

FIG. 14 shows another example of a foldable stroller assembly 300 constructed in accordance with the teachings of the present invention. In this example, the stroller assembly 300 has a frame assembly that is essentially identical to the frame assembly 51 described above with respect to the stroller assembly 50. Thus, when describing aspects of the stroller assembly 300, the same reference names and reference numbers are utilized. New reference numbers are used only to introduce elements that are different from the earlier example. The stroller assembly 300 in this example has a foldable seat assembly 302 as the child support structure and is similar to the earlier described seat assembly 100. Again, like components are given the same reference names and reference numbers in comparison to the seat assembly 100. New reference numbers are used when introducing elements of the seat assembly 302 that are different from the earlier example.

In this example, the child support structure is movable on the frame assembly between a usable state or position and an unusable state or position while remaining on the frame assembly. A part of the child support structure in one example can be movable relative to another part. In the disclosed example, a seat back part is pivotable relative to the seat bottom part in order to fold the seat assembly to an unusable state and unfold the seat assembly for use as a seat. The interlock mechanism in the following example cooperates with the movement of the child support structure between the locked and unlocked positions or states.

The stroller assembly 300 is illustrated in the set-up configuration in FIG. 14. The seat assembly 302 in this example is again shown with no soft goods. The assembly 302 has an upper seat frame 102 and a lower seat frame 104 connected to one another by mound and fold structures 304. Each structure 304 has an upper connector 194 coupled to the frame legs 108 of the upper seat frame 102 and a lower connector 196 coupled to the frame legs 110 of the lower seat frame 104. In this example, the frame connectors 194 and 196 are pivotally coupled to one another at a pivot hub 306. The pivot hub 306 in this example has one portion connected to the seat mount 210, which renders the seat assembly 302 removable as in the prior example. As will be evident to those having ordinary skill in the art upon reading this disclosure, the seat assembly 302 in this example need not be removable or reversible, if desired for a particular stroller application. An optional pivoting arm bar 308 is also illustrated as a part of the seat assembly 302 in this example, replacing the cupholders 112. The arm bar 308 can pivot when the stroller assembly 300 is reconfigured to the folded configuration or can be removable from the seat assembly. Details of the arm bar 308 are not further discussed herein.

Figure 15:
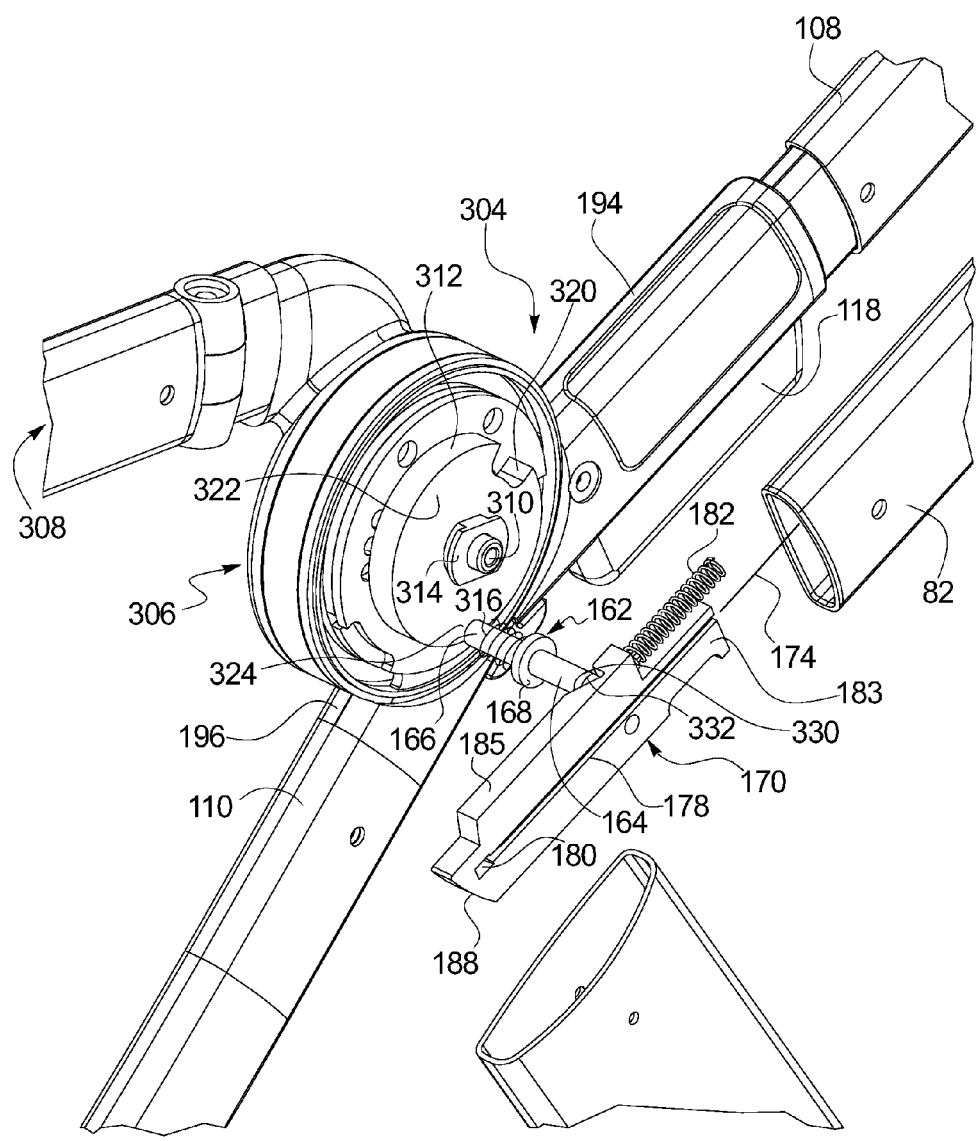
FIG. 15 shows a close-up view from the outside of the left side fold joint and seat connecting structure on the stroller assembly in FIG. 14 and in the set-up configuration wherein a number of the fold joint components are hidden.

FIG. 15 shows an outside view of the left side fold joint 56 on the stroller assembly 300 in FIG. 14. FIGS. 16 and 17 show alternate inside views of the fold joint 56 with most of the components intact. In FIG. 16, the shell cover 160, which carries the seat connector 222, is shown with the seat assembly hidden. In FIG. 17, the shell cover 160 is hidden to expose the shell section 158 carried on the fold joint housing 130. In FIG. 15, a majority of the housing 130 and other components of the fold joint 56 are hidden to reveal the latch finger 170, latch spring 182, latch cable 174, push bar 82, and rear leg 58.

Also in FIG. 15, portions of the structure 304 on the seat assembly 302 are hidden. For example, the seat mount 210 (which in this example would not require the ramp 218) and a portion of an outer cover for the pivot hub 306 are not shown, thus revealing the guts of the pivot hub 306 on the seat assembly. The seat assembly 302 has a seat pivot 310 about which the upper and lower seat frames 102 and 104 can pivot relative to one another. An interlock plate 312 is affixed to the pivot 310 by a keyed fastener 314 and rotates with the pivot. In this example, the lock pin 162 again has a locking end 164 and contact end 166 separated from one another by a washer 168. In this example, the lock pin 162 is biased in an outward direction toward the latch finger 170 by a pin spring 316. In the prior example, the pin spring 169 biased the pin inward. One end of the spring 316 bears against the washer 168 and is received over the contact end 166 of the pin. The other end of the spring 316 bears against an interior but outward facing surface of the shell cover 160, which is hidden in this view.

The interlock plate 312 has an opening through the plate or a notch 320 formed in a perimeter edge of the plate. An outer face 322 of the interlock plate 312 is positioned to bear against a tip 324 on the contact end 166 of the pin 162. The tip 324 need not be rounded in comparison to the pin tip 236 of the prior example, although the tip 324 can be somewhat rounded, if desired. The interlock plate 312 is positioned with the notch 320 spaced circumferentially or rotationally away from the lock pin 162, as shown in FIG. 15, with the frame assembly 57 of the stroller assembly 300 in the set-up configuration. The pin spring 316 in this example biases the pin 162 in the outward direction away from the interlock plate 312. The face 322 prevents the pin from being moved inward toward the pivot hub 306. The pin is thus captured in the locked state. A ramped surface 330 is formed into or recessed into the material on the inner side of the latch finger 170. A locking tip 332 on the end of the locking end 164 of the pin 162 seats against the ramped surface 330 in the frame set-up and latched configuration.

If a user attempts to actuate the actuator 90 on the handle assembly 80, the cable 174 will attempt to withdraw the latch finger 170 toward the push bar 82. The ramped surface 330 is angled so that the tip 332 on the pin 162 would push or force the pin inward. However, with the stroller and seat assembly in the set-up configuration and usable state, respectively, the face 322 on the interlock plate 312 blocks movement of the lock pin 162 in this direction. Thus, the fold joint 56 and particularly the latch finger 170 are locked and cannot be released. In the locked state, the interlock mechanism again locks the frame assembly from folding to the folded configuration.

Figure 18:
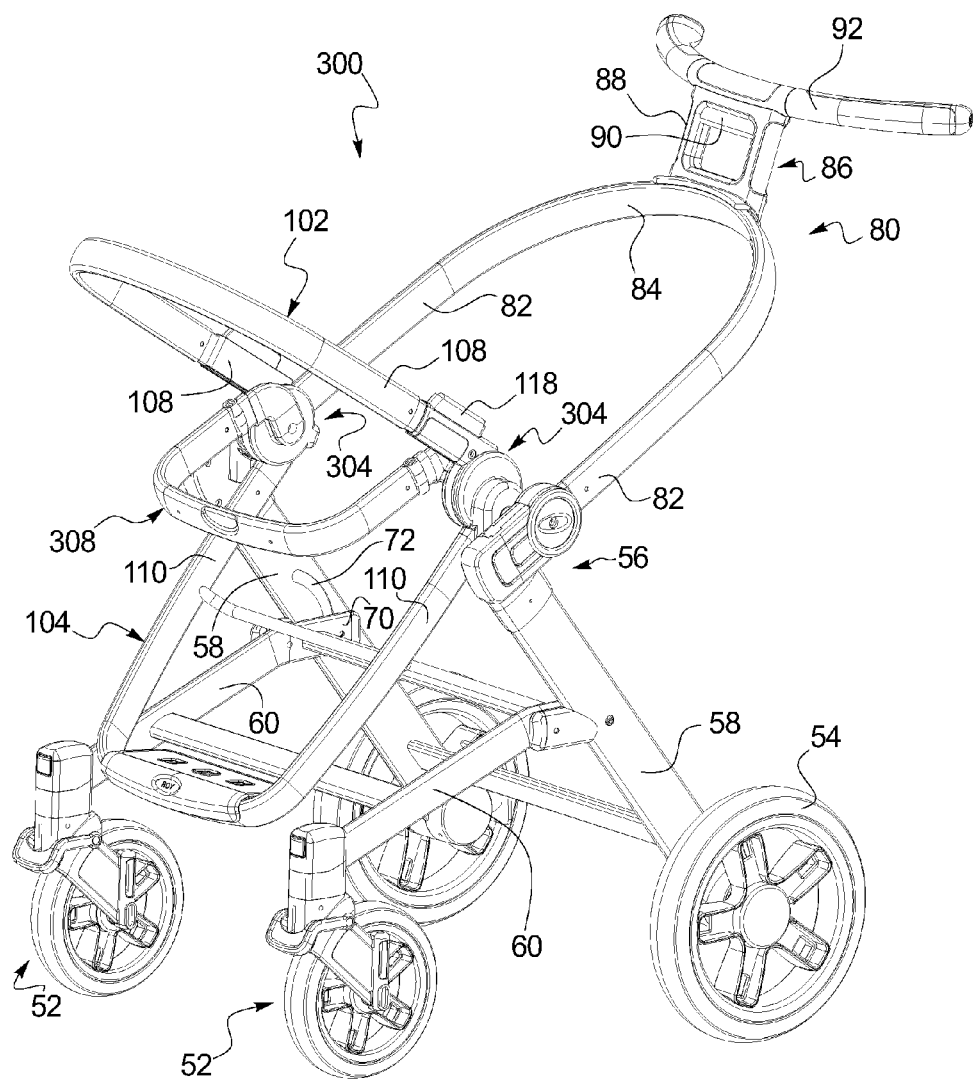
FIG. 18 shows the stroller assembly in FIG. 14 with the seat assembly in a partly folded configuration.

The seat assembly 302 must first be moved to the unusable state, i.e., be completely folded, in order to unlock the interlock mechanism and permit the fold joint to fold. FIG. 18 shows the seat assembly 302 in a partly folded configuration. In order to fold the seat assembly, the user must push the upper seat frame 102 forward about the seat pivot 310. In one example, the release button 118 can be configured to provide two functions. One function would be to release a seat fold catch (not shown) that retains the seat frame in the unfolded configuration. The other function would be to release the seat assembly 302 entirely from the stroller frame assembly 51 as in the prior embodiment. In another example, no seat fold catch need be provided and the seat frame 102 could freely be folded forward at any time. In a further embodiment, a separate seat fold actuator can be provided as part of the seat assembly 302, if desired, and spaced from the release button.

Figure 19:
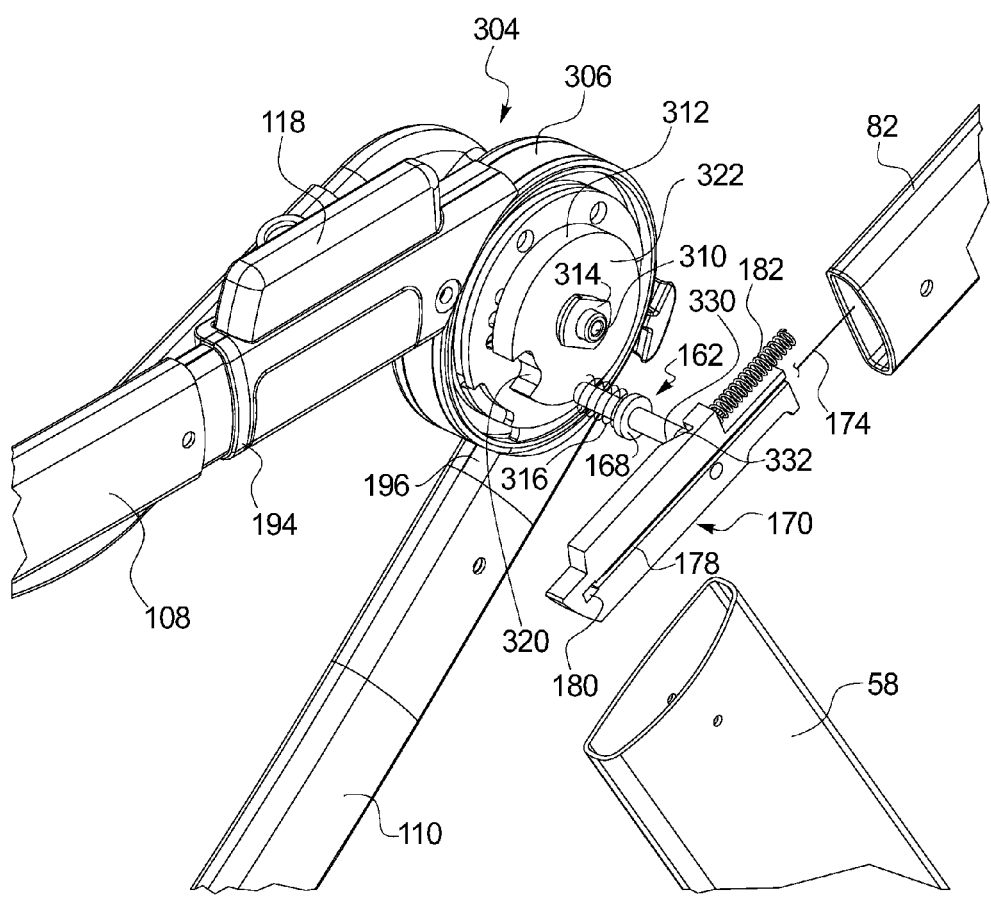
FIG. 19 shows the fold joint and seat connecting structure in FIG. 17 but with the seat assembly partially folded as in FIG. 18.
Figure 20:
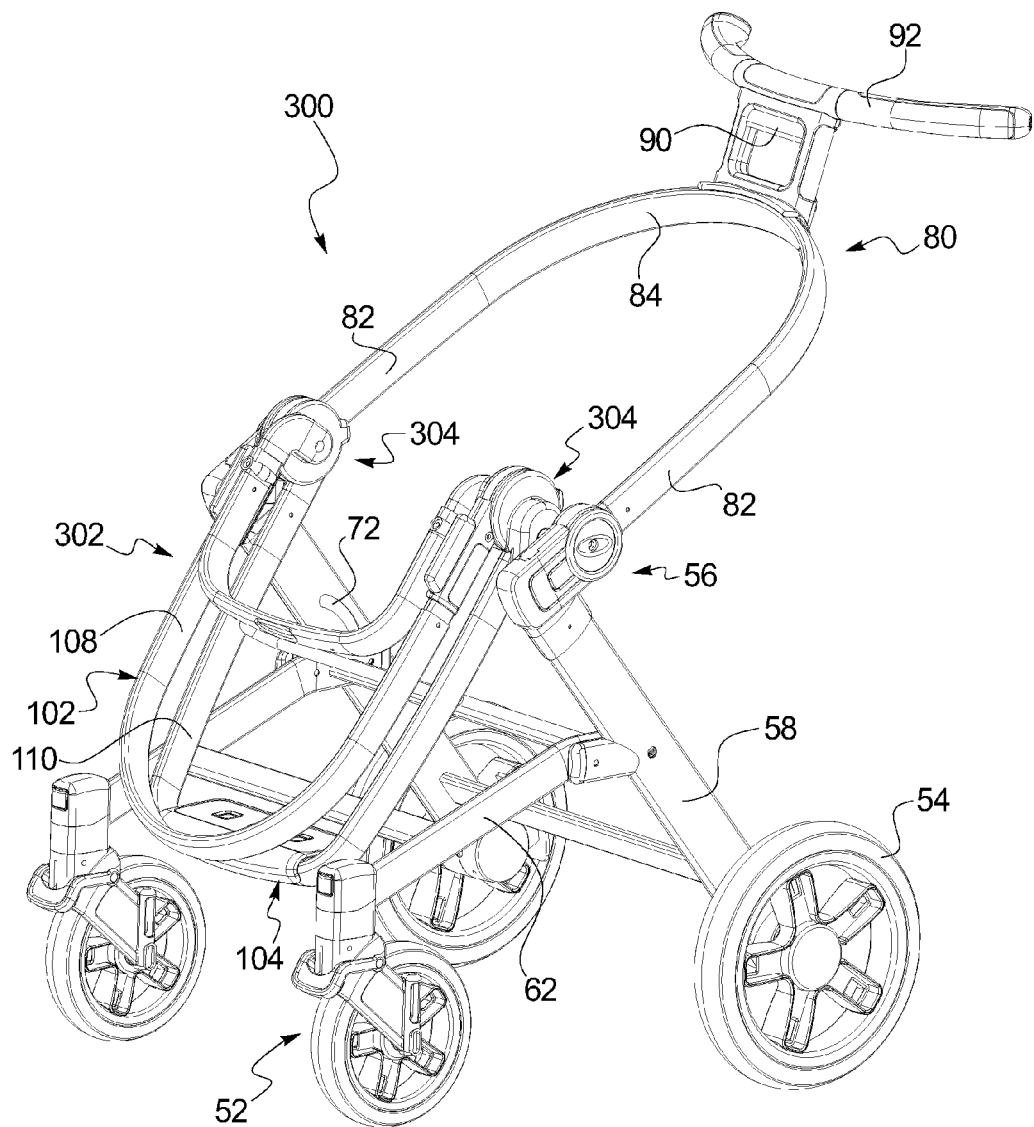
FIG. 20 shows the stroller assembly in FIG. 18 with the seat assembly in a fully folded configuration.
Figure 21:
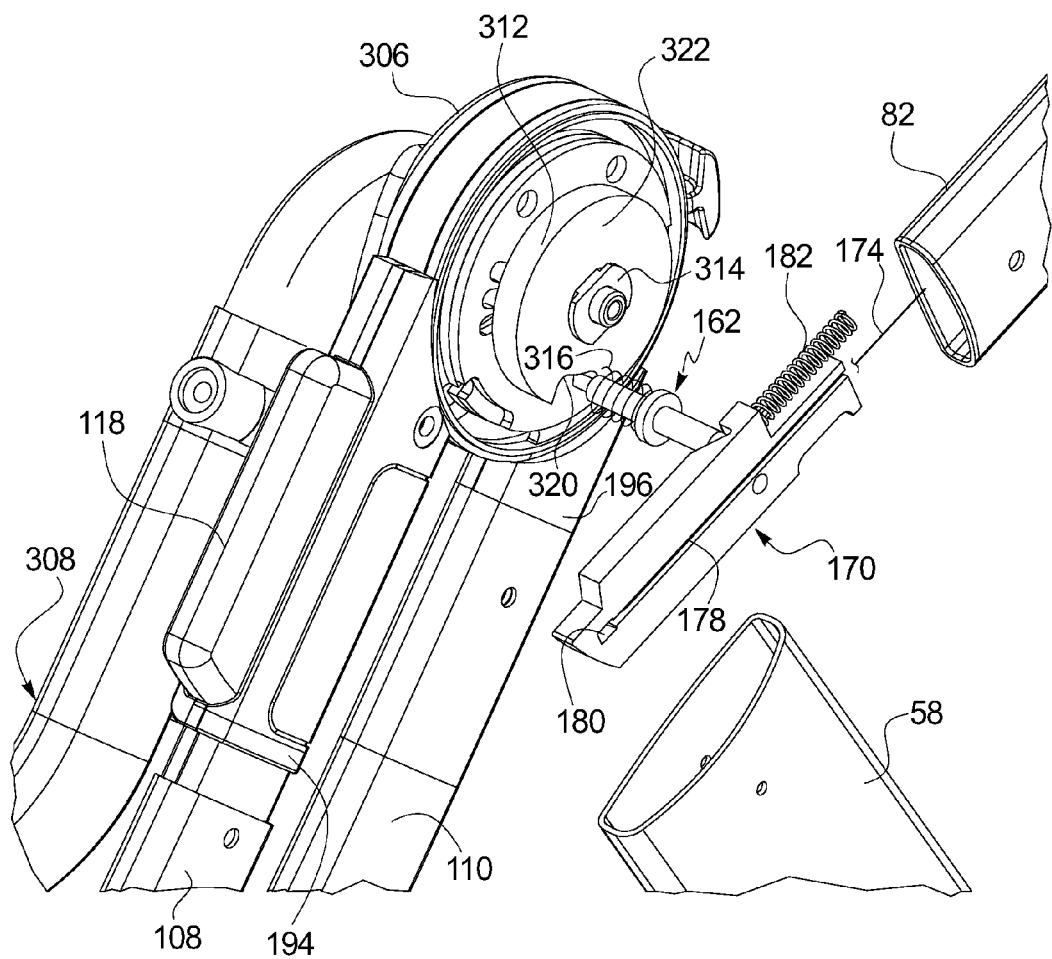
FIG. 21 shows the fold joint and seat connecting structure in FIG. 19 but with the seat assembly completely folded as in FIG. 20.

As the upper seat frame 102 folds forward, the interlock plate 312 rotates in unison with the seat pivot 310. This rotates the notch 320 as depicted in FIG. 19. With the upper seat frame 102 in a partly folded configuration, the face 322 of the interlock plate 312 still blocks inward movement of the lock pin 162. The seat assembly 302 is shown in FIG. 20 in a completely folded configuration. In this configuration, the upper seat frame 102 lies adjacent and generally parallel with the lower seat frame 104 in this example. As shown in FIG. 21, the notch 320 in the interlock plate 312 is aligned with the lock pin 162 when the seat assembly 302 is completely folded. In this example, the pin spring 316 still biases the lock pin 162 in the outward direction, away from the plate 312, and against the latch finger 170 and particularly the ramped surface 330.

Figure 22:
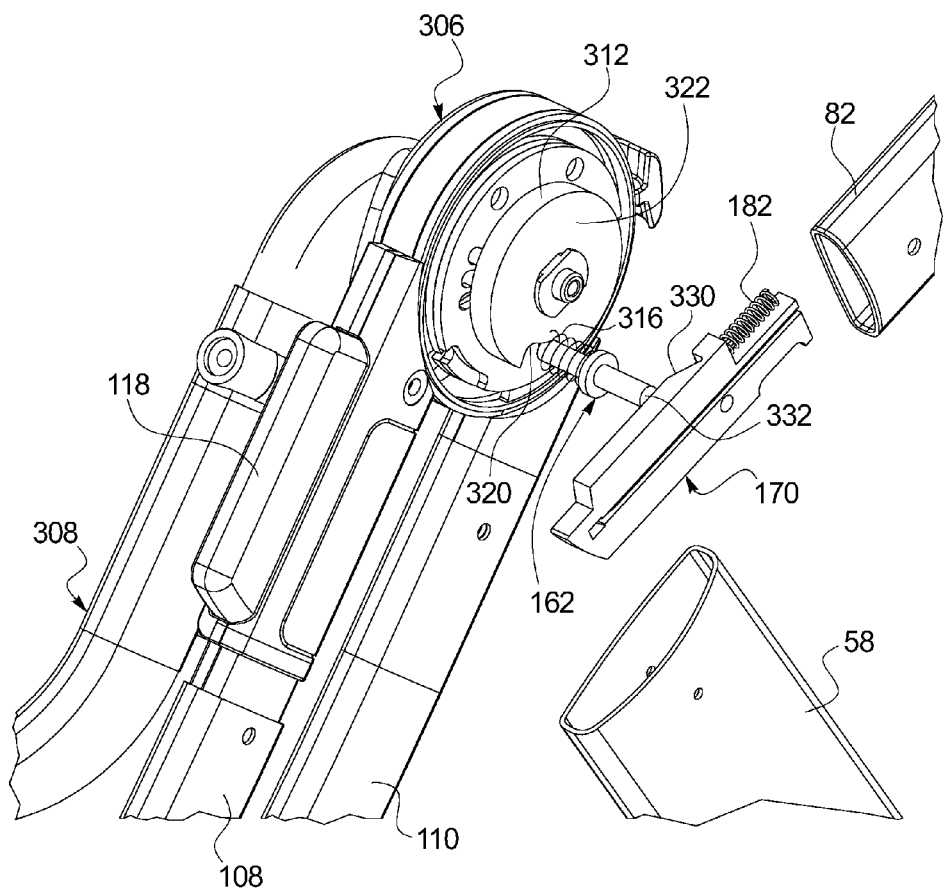
FIG. 22 shows the fold joint and seat connecting structure in FIG. 21 but with the fold latch in a released condition.
Figure 23:
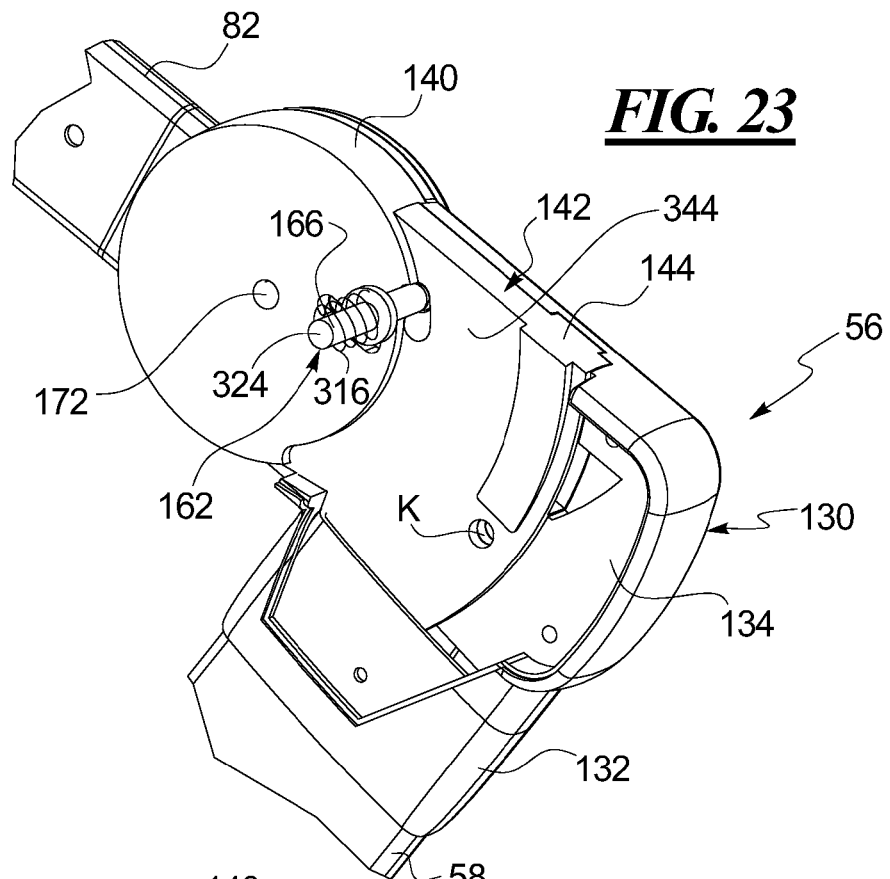
FIG. 23 shows an inside view of the fold joint in FIG. 22 with the seat connector shell section and the shell cover hidden.

However, the interlock mechanism is now in an unlocked state. The user can now actuate the actuator 90, to pull on the cable 174 and the latch finger 170 toward the end of the push bar 82. The tip 332 on the locking end 164 of the pin 162 rides along the ramped surface 330 as the latch finger moves. Movement of the latchfinger 170 pushes the lock pin 162 inward and the contact end 166 moves into the notch 320 as shown in FIG. 22. As a latch finger 170 moves, the end 185 of the latch finger can then clear the latch housing 130 within the slot 136, as described above, permitting the fold joint 56 to fold. However, because the lock end 162 is still biased outward by the pin spring 316, the locking end tip 332 must still clear the thickness of the inner cam plate 256. To that end, a hole 340 is formed through the inner cam plate 256 through which the lock pin 162 extends. As shown in FIG. 23, a chamfered or tapered entry 342 is formed in the exposed face 344 of the cam plate 256 at one edge of the hole 340.

Figure 26:
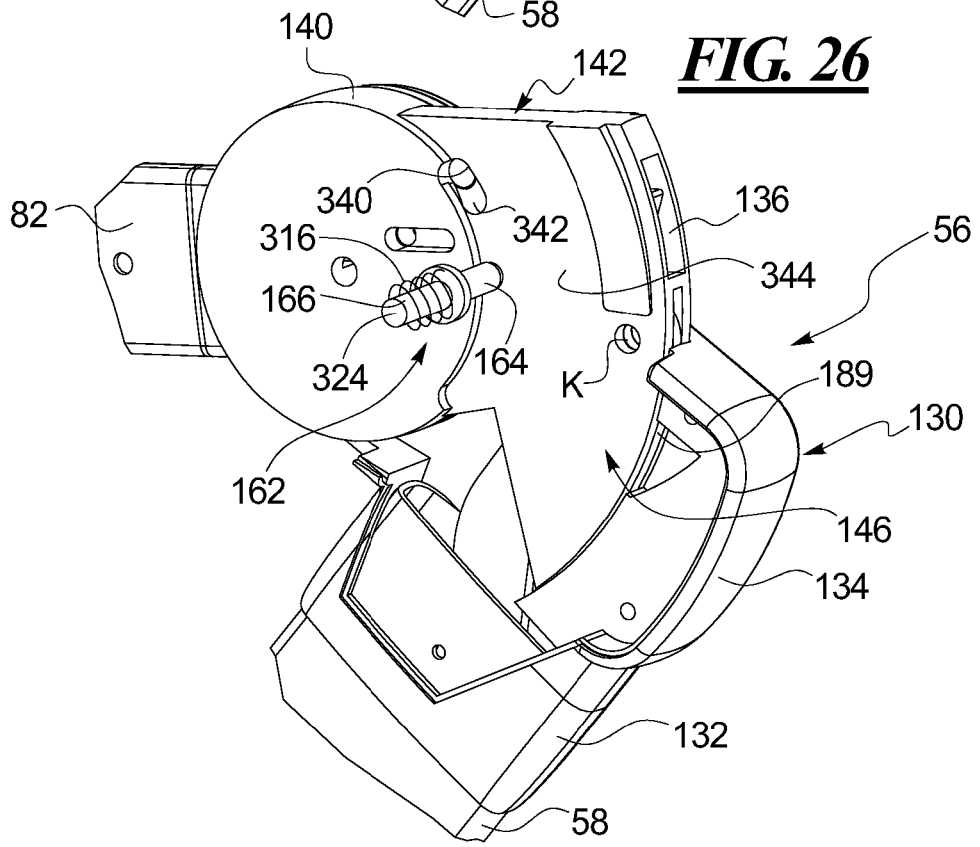
FIG. 26 shows the inside view of the fold joint in FIG. 23 but with the stroller frame partially folded as in FIGS. 24 and 25.
Figure 24:
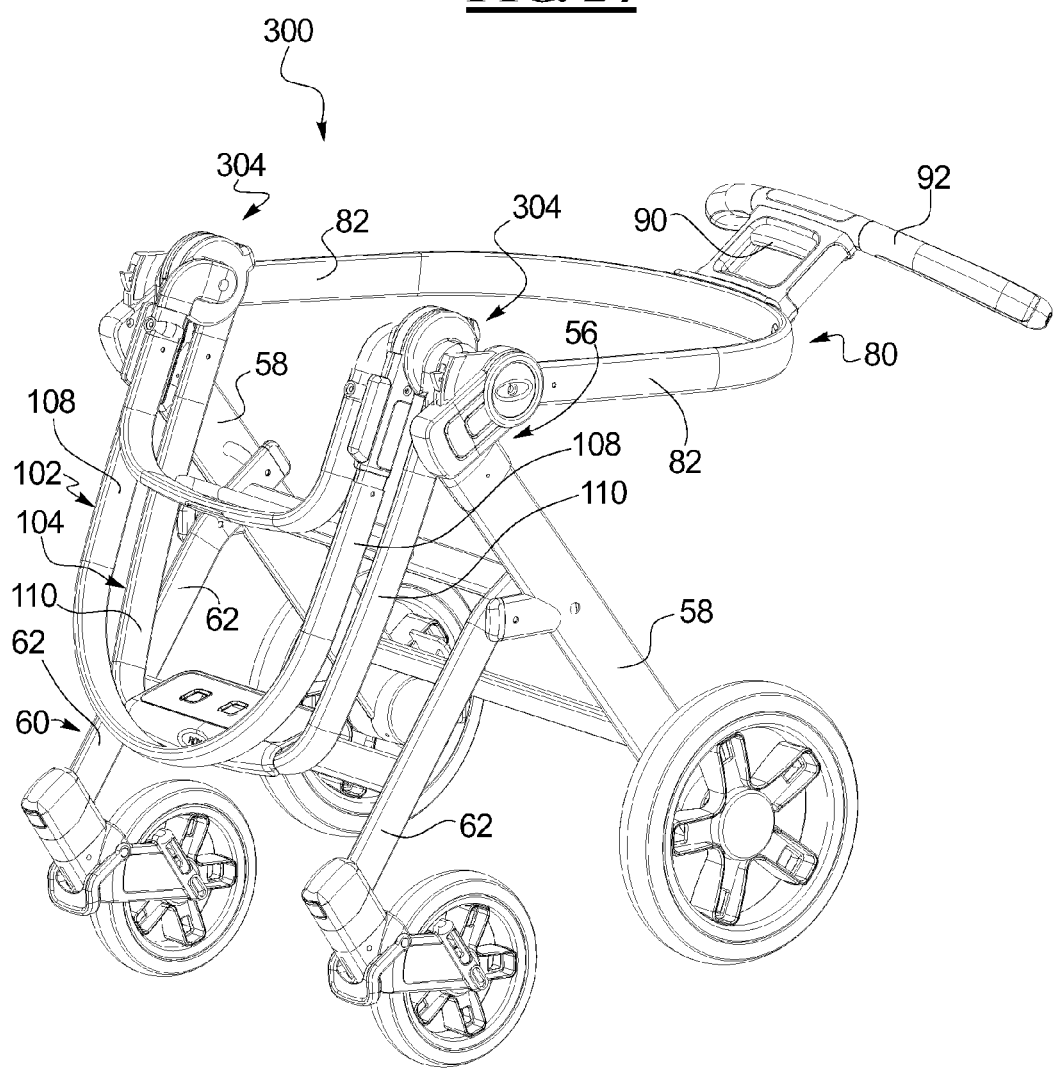
FIG. 24 shows the stroller assembly in FIG. 20 but with the stroller frame in a partly folded configuration.
Figure 25:
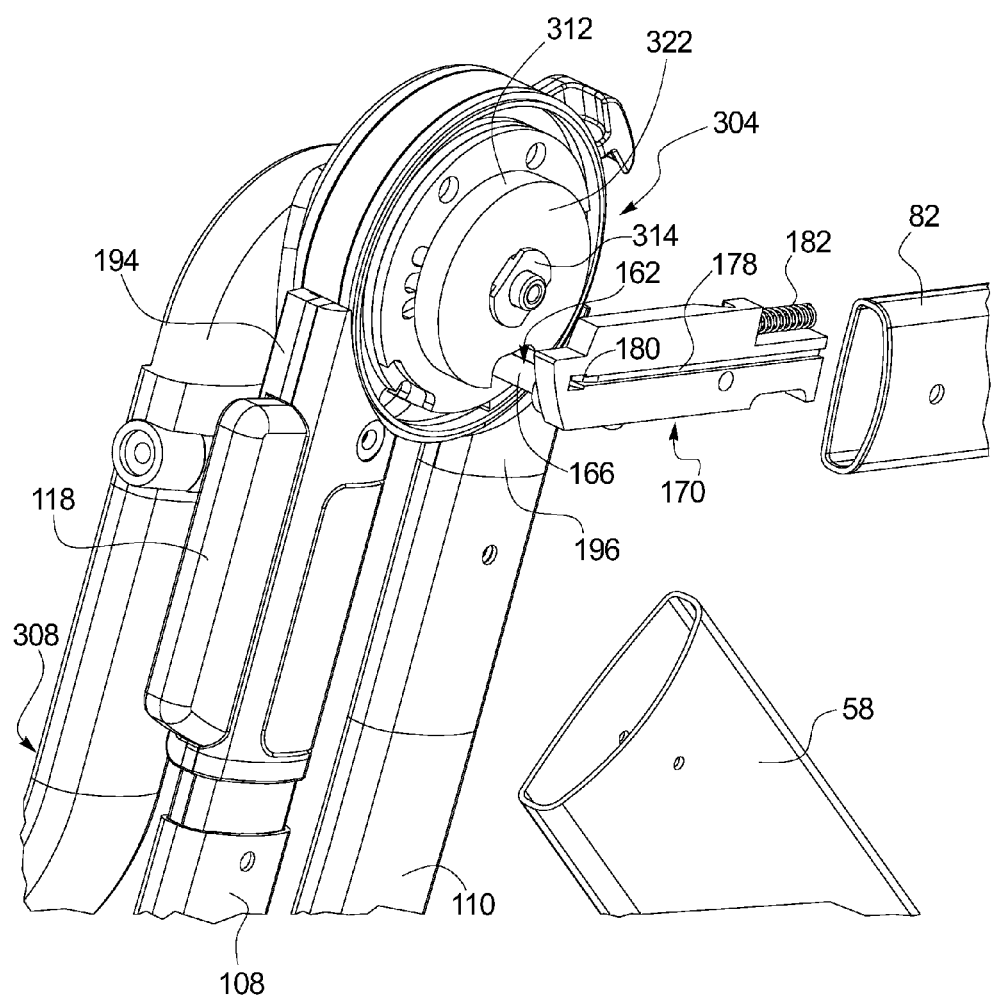
FIG. 25 shows the fold joint and seat connecting structure in FIGS. 22 and 23 but with the stroller frame partially folded as in FIG. 24.

FIG. 24 shows the frame assembly 51 in a partly folded configuration with the handle assembly 80 pushed downward toward the rear legs 58. FIG. 25 shows the configuration of the fold joint 56 and seat pivot hub 306 in this partly folded configuration. FIG. 26 shows an inside view of the fold joint 56 with the seat assembly 302 hidden for better illustration. The thin edge of the chamfered entry 342 contacts and wedges under the tip 332 on the lock pin 162 as the joint 56 is folded, and thus as the cam 142 rotates upward. The rounded tip 332 rides on the chamfered entry 342, which pushes the pin 162 further inward against the spring bias until the pin clears the hole 340 and bears against the exposed cam plate face 344. The pin in this unlocked position or state will ride along the face 344 as the fold joint 56 is folded further, as shown in FIG. 26.

Figure 27:
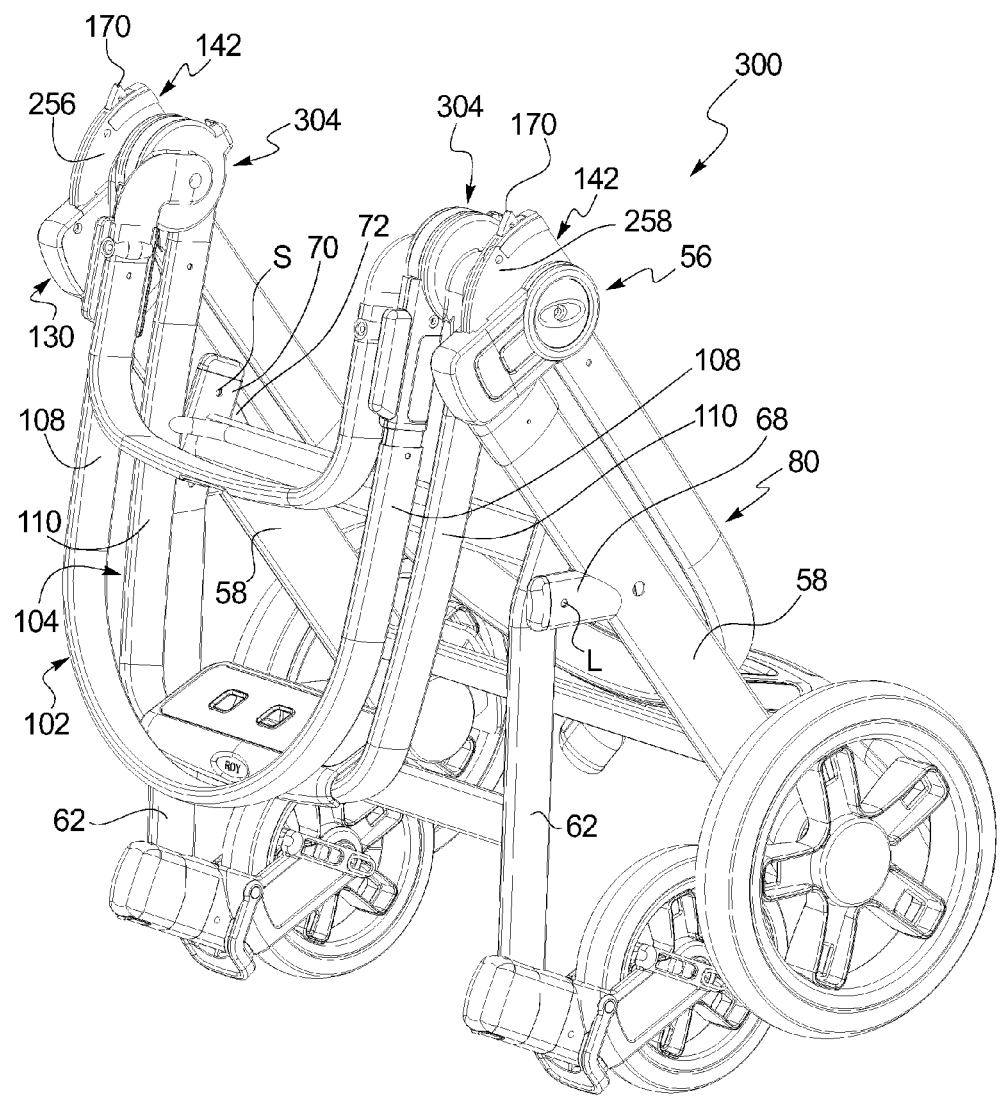
FIG. 27 shows the stroller assembly in FIG. 24 but with the stroller frame in a completely folded configuration.
Figure 28:
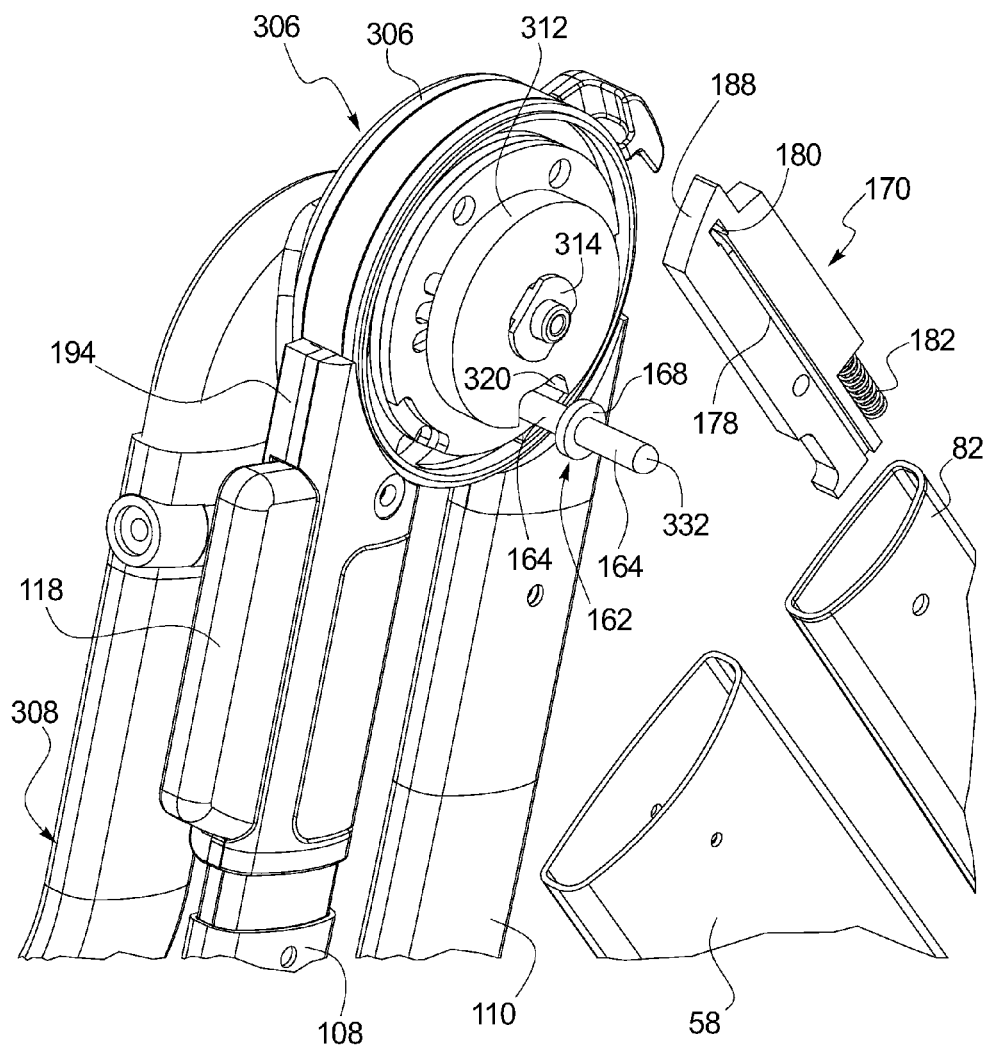
FIG. 28 shows the fold joint and seat connecting structure in FIGS. 25 and 26 but with the stroller frame completely folded as in FIG. 27.
Figure 29:
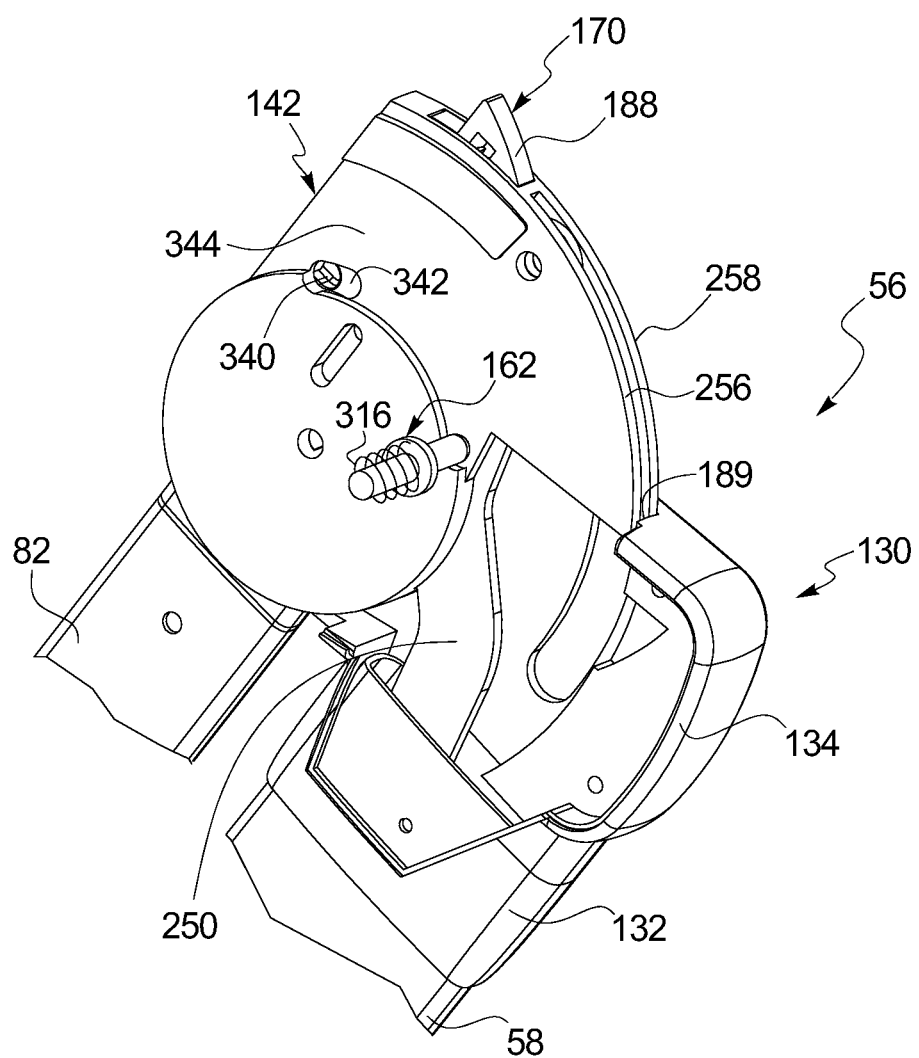
FIG. 29 shows the inside view of the fold joint in FIG. 26 but with the stroller frame completely folded as in FIGS. 27 and 28.

FIG. 27 shows the stroller assembly 300 in a completely folded configuration. In this configuration, the seat assembly 302 remains completely folded and the frame assembly 51 is now completely folded as well. FIG. 28 shows the fold joint 56 and the structure 304 of the seat assembly 302 in the completely folded configuration. As illustrated, the lock pin 162 is still seated in the notch 320 in the interlock plate 312 in the unlocked state. As shown in FIG. 29, the tip 332 on the locking end 164 of the pin is borne against the exposed cam plate surface 344. As a result, the pin spring 316 is prevented from biasing the pin outward. Thus, the pin 162 is retained in the notch 320 with the frame assembly 51 in the folded configuration. The seat assembly 302 can not be unfolded because the upper frame 102 can not be rotated with the pin 162 seated in the notch 320.

In order to unfold the seat assembly 302, the stroller frame assembly 51 must first be unfolded. The lock pin 162 cannot fire outward via the spring 316 until the pin is again aligned with the hole 340 in the cam plate 256. This will not occur until the frame assembly 51 is completely unfolded. In addition, the pin 162 cannot completely exit or clear the notch 320 until the latch finger 170 is latched and positions the ramped surface 330 in line with the pin. The fold joint 56 must then also be latched before the seat assembly 302 can be unfolded. The interlock device in this example thus prevents the seat assembly 302 from being unfolded until the frame assembly 98 is completely unfolded and properly latched. The interlock mechanism in this example is formed by the lock pin 162 and portions of other parts such as the pin spring 316, the interlock plate 312 including the notch 320, the cam plate 256 including the exposed surface 344, chamfer 342, and hole 340, and the ramped surface 330 on the latch finger 170.

As will become evident to those having ordinary skill in the art, the disclosed interlock mechanisms can vary in configuration and construction and yet fall within the spirit and scope of the present invention. In general, the intent of the interlock devices disclosed and described herein is to prevent a stroller seat from being utilized when the stroller is being folded or after the stroller is completely folded. In other words, the disclosed stroller assemblies 50 and 300 do not permit a child to sit in the toddler seat (seat assembly 100 and seat assembly 302) unless the stroller assembly is in a completely unfolded and a latched configuration. In the first disclosed example, the seat assembly 100 must be completely removed from the frame assembly 51 before the frame can be folded. Further, the frame 51 must be completely unfolded and latched before the seat assembly 100 can be reattached to the frame assembly. As a result, a child cannot sit on the stroller seat with the frame assembly folded because the seat is not connected to the frame assembly and the frame cannot be folded unless the seat is removed. In the second disclosed example, the seat assembly 302 must be completely folded relative to the frame assembly 51 before the frame can be folded. Once the seat assembly 302 is completely folded, it cannot again be unfolded until the frame assembly 51 is completely unfolded and latched.

Two specific examples of interlock devices and mechanisms have been shown and described herein. The various components of these devices can be altered and rearranged and yet fall within the spirit and scope of the present invention. Interaction between the seat components and the frame components as well as relative interaction of the locking pin with such components can also vary. The locking pin can be replaced by other locking or latching mechanisms as well. One aspect of the disclosed interlock devices is to prevent a fold latch of the stroller frame assembly 51 from being unlatched or released with the stroller seat still positioned and configured to accept a seat occupant. Another aspect of the disclosed interlock devices is to prevent the stroller seat from being positioned and configured for use on the stroller frame unless the frame is in a set-up and latched configuration.

Although certain strollers, seats, fold joints, connections, and interlock components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A foldable stroller comprising:
a frame assembly having a frame fold joint and being reconfigurable between a set-up configuration and a folded configuration;
a fold latch on the frame fold joint movable from a latched position with the frame assembly in the in-use configuration to a released position, the fold latch having a notch;
a mounting point on the frame assembly defined by a connector that has a lock pin parallel to and offset from a frame pivot axis, the lock pin being spring biased to project from the connector;
a child support structure having a mount attachable to the frame assembly at the mounting point and being detachable from the mounting point and removable from the frame assembly, the mount including a mount surface; and
an interlock mechanism coupled to the mounting point and movable between a locked state locking the frame assembly in the set-up configuration and an unlocked state permitting the fold latch to move to the released position thereby permitting the frame assembly to be reconfigured to the folded configuration,
wherein, with the frame assembly in the set-up configuration and the child support structure attached to the mounting point, the mount is coupled with the connector and the mount surface bears against the lock pin pushing the lock pin into the notch preventing actuation of the fold latch and thereby the interlock mechanism is retained in the locked state, and
wherein, to fold the frame assembly, the child support structure is first detached from the mounting point and the mount surface releases the lock pin from the notch, which moves the interlock mechanism to the unlocked and permits actuation of the fold latch thereby allowing the stroller to be moved to the folded configuration.

2. A foldable stroller according to claim 1, wherein the child support structure is a seat assembly and wherein the interlock mechanism is unlocked when the seat assembly is detached from the mounting point and removed from the stroller.

3. A foldable stroller according to claim 1, wherein, with the frame assembly in the set-up configuration and the child support structure attached to the mounting point, the lock pin is pushed into the connector in the locked state.

4. A foldable stroller according to claim 3, wherein, upon removal of the child support structure from the frame assembly, a contact end of the lock pin projects outward from the connector in the unlocked state, the lock pin having a locking end opposite the contact end.

5. A foldable stroller according to claim 1, wherein the interlock mechanism is retained in the unlocked state unless the frame assembly is in the set-up configuration.

6. A foldable stroller according to claim 5, wherein the interlock mechanism in the unlocked state prevents attaching the child support structure to the mounting point.

7. A foldable stroller comprising:
a frame assembly having a frame fold joint and a seat connector defining a mounting point and being reconfigurable between an in-use configuration and a folded configuration, the seat connector including a lock pin parallel to and offset from a frame pivot axis, the lock pin having a contact end that protrudes from the seat connector in an unlocked state and a locking end, the lock pin being biased by a spring in a direction parallel to the frame pivot axis to project from the seat connector;
a fold latch at the frame fold joint, the fold latch having a notch and being movable between a latched position with the frame assembly in the in-use configuration and a released position;
a seat assembly on the frame assembly including a seat mount with a mount surface shaped to engage the seat connector and having a movable part that is movable relative to the frame assembly between an in-use position and a folded position on the frame assembly rendering the seat assembly unsuitable to support a child; and
an interlock mechanism movable between a locked state with the fold latch in the latched position locking the frame assembly in the in-use configuration and an unlocked state with the fold latch in the latched position permitting the frame assembly to fold to the folded configuration,
wherein, with the frame assembly in the in-use configuration and the seat assembly in the in-use position, the seat mount is coupled to the seat connector and the mount surface bears against the contact end of the lock pin and retains the locking end against the bias of the spring in the notch and the interlock mechanism is retained in the locked state thereby retaining the frame assembly in the in-use position, and wherein the interlock mechanism is unlocked by first moving the movable part to the folded position, allowing the bias of the spring to move the locking end out of the notch, whereby the interlock mechanism is moved to the unlocked state so that the frame assembly is movable to the folded configuration.

8. A foldable stroller according to claim 7, wherein the seat assembly has a seat back part and a seat bottom part, the seat back part being pivotable relative to the seat bottom part from the in-use position to the folded position.

9. A foldable stroller according to claim 7, wherein the movable part pivots relative to the frame assembly from the in-use position to the folded position.

10. A foldable stroller according to claim 7, wherein the interlock mechanism comprises:

an interlock plate carried on the seat assembly and rotatable about a pivot axis; and an opening in the interlock plate that rotates with the interlock plate from a locking orientation to an unlocking orientation as the movable part is moved to the folded position.

11. A foldable stroller according to claim 10, wherein the lock pin is arranged to bear against the interlock plate and lock the frame fold joint in the locked state and to move into the opening thereby releasing the frame fold joint in the unlocked state.

12. A foldable stroller according to claim 7, wherein the interlock mechanism in the unlocked state retains the seat assembly in the folded position.

13. A foldable stroller according to claim 12, wherein the interlock mechanism is in the unlocked state unless the frame assembly is in the in-use configuration and the frame fold joint is latched.

* * * * *